(12) United States Patent
Hayashi

(10) Patent No.: US 7,447,314 B2
(45) Date of Patent: Nov. 4, 2008

(54) INFORMATION PROCESSING METHOD, INFORMATION PROCESSING APPARATUS, PROGRAM, AND STORAGE MEDIUM

(75) Inventor: Junichi Hayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 808 days.

(21) Appl. No.: 10/965,874

(22) Filed: Oct. 18, 2004

(65) Prior Publication Data
US 2005/0078820 A1    Apr. 14, 2005

(51) Int. Cl.
*G06K 9/36*    (2006.01)
(52) U.S. Cl. ............... 380/210; 382/100; 382/232
(58) Field of Classification Search ........... 380/210; 382/100, 232
See application file for complete search history.

(56) References Cited

U.S. PATENT DOCUMENTS

| | | | |
|---|---|---|---|
| 6,473,859 B1 | 10/2002 | Enokida | |
| 6,983,049 B2 * | 1/2006 | Wee et al. | 380/200 |
| 6,990,202 B2 * | 1/2006 | Wee et al. | 380/200 |
| 7,054,335 B2 * | 5/2006 | Wee et al. | 370/486 |
| 7,155,010 B2 * | 12/2006 | Wee et al. | 380/37 |
| 7,184,548 B2 * | 2/2007 | Wee et al. | 380/37 |
| 2002/0163911 A1 * | 11/2002 | Wee et al. | 370/389 |
| 2002/0164017 A1 * | 11/2002 | Wee et al. | 380/37 |
| 2002/0164018 A1 * | 11/2002 | Wee et al. | 380/37 |
| 2002/0199106 A1 | 12/2002 | Hayashi | |
| 2003/0068040 A1 * | 4/2003 | Wee et al. | 380/200 |
| 2003/0068041 A1 * | 4/2003 | Wee et al. | 380/200 |
| 2003/0070081 A1 * | 4/2003 | Wee et al. | 713/189 |
| 2003/0081809 A1 * | 5/2003 | Fridrich et al. | 382/100 |
| 2003/0190042 A1 | 10/2003 | Tagashira et al. | 380/45 |
| 2004/0081334 A1 | 4/2004 | Hayashi | |
| 2004/0153674 A1 | 8/2004 | Hayashi | |
| 2004/0174999 A1 | 9/2004 | Hayashi | |
| 2004/0177251 A1 | 9/2004 | Hayashi | |

FOREIGN PATENT DOCUMENTS

| | | |
|---|---|---|
| JP | 7-15715 | 1/1995 |
| JP | 9-37010 | 12/1997 |
| JP | 9-327010 | 12/1997 |
| JP | 11-18070 | 1/1999 |
| JP | 11-98487 | 4/1999 |
| JP | 11-331618 | 11/1999 |

OTHER PUBLICATIONS

W. Zeng and S. Lei. "Efficient Frequency Domain Video Scrambling for Content Access Control" Proceedings of the seventh international conference on Multimedia. (C)1999 ACM. pp. 285-294.*

* cited by examiner

*Primary Examiner*—KimYen Vu
*Assistant Examiner*—Thomas Gyorfi
(74) *Attorney, Agent, or Firm*—Fitzpatrick, Cella, Harper & Scinto

(57) ABSTRACT

A bitstream of each tile in a code sequence is segmented into bitstreams for respective resolution levels (S70). Image key K_I is generated (S71). Bitstream key K_BS is generated from image key K_I using encoding parameters P (S72). Key K_Ti of tile Ti is generated from bitstream key K_BS using information associated with that tile (S74). Finally, keys corresponding to the segmented bitstreams indicating respective resolutions in tile Ti are generated (S76).

4 Claims, 25 Drawing Sheets

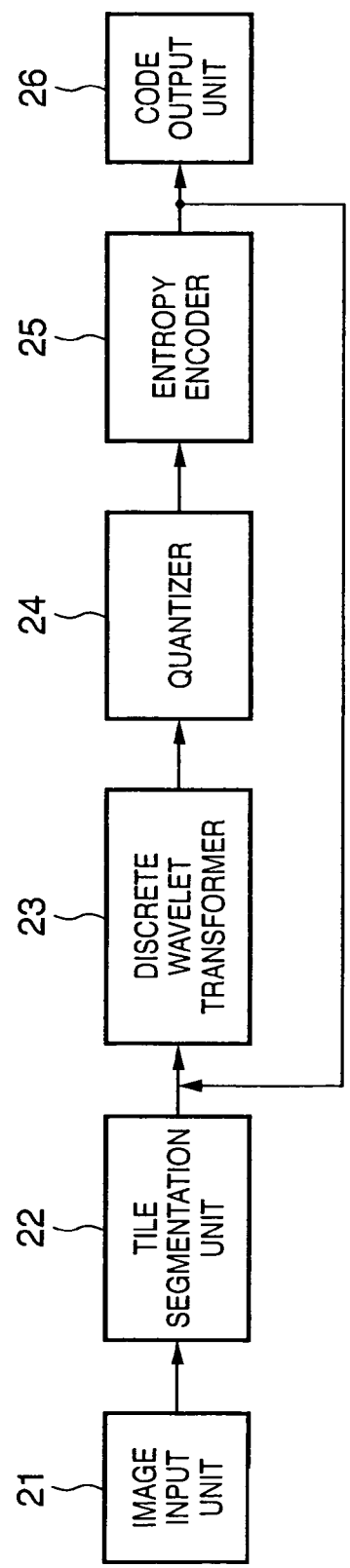

FIG. 8

| TILE INDEX | RESOLUTION INDEX |

FIG. 10

| ID | TILE INFORMATION | OFFSET | LENGTH |
|---|---|---|---|
| 0101 | (0,0) | 0 | 7 |
| 0102 | (0,0) | (9) | 8 |
| 0103 | (0,0) | (15) | 5 |
| ⋮ | ⋮ | ⋮ | ⋮ |
| 0202 | (64,0) | (12) | 9 |
| ⋮ | ⋮ | ⋮ | ⋮ |

| OFFSET | LENGTH |
|--------|--------|
| 0      | 30     |
| 45     | 15     |
| 75     | 45     |

| START POINT | END POINT |
|-------------|-----------|
| 0           | 30        |
| 45          | 60        |
| 75          | 120       |

F I G. 18
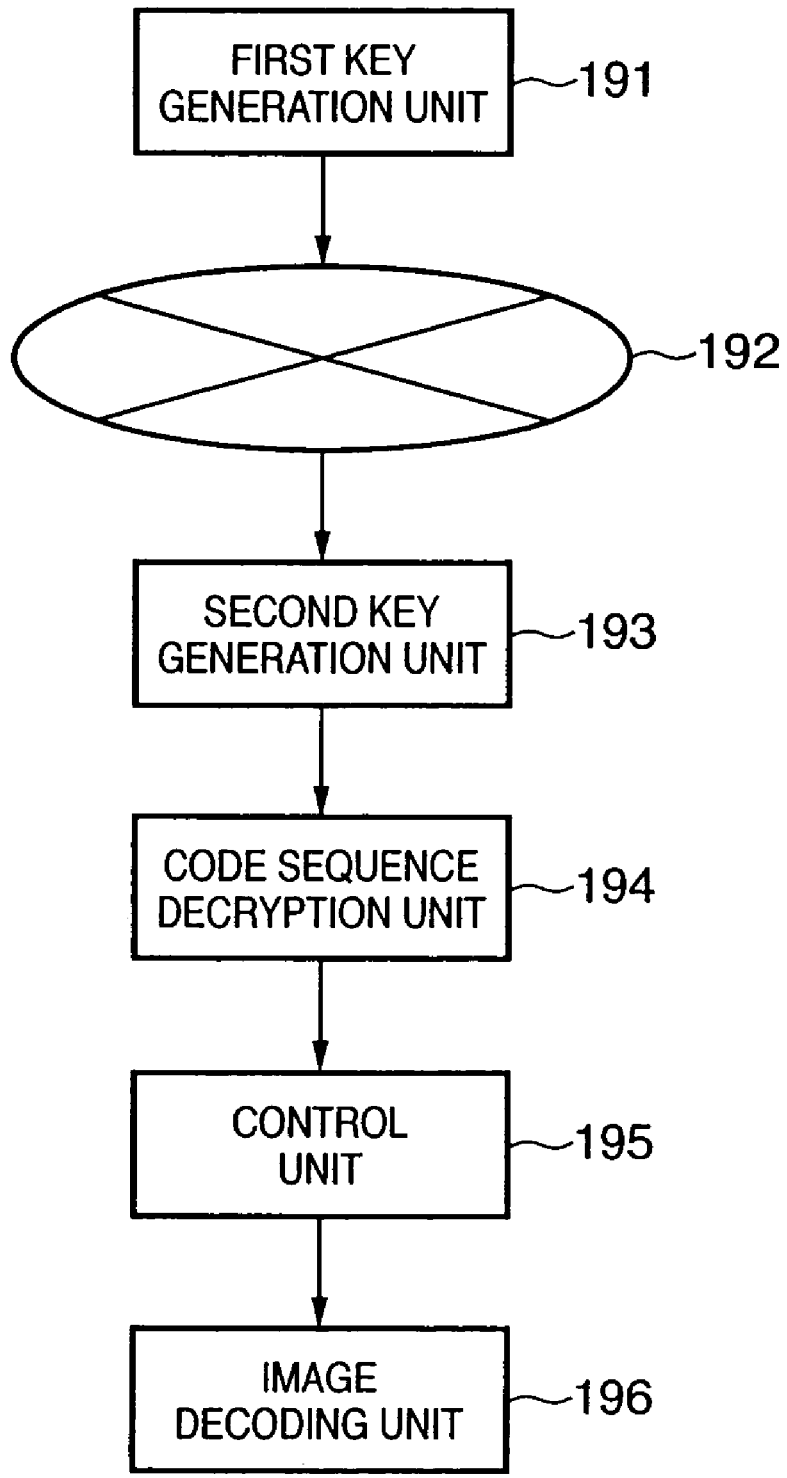

INFORMATION PROCESSING METHOD, INFORMATION PROCESSING APPARATUS, PROGRAM, AND STORAGE MEDIUM

TECHNICAL FIELD

The present invention relates to an information processing apparatus for encrypting an image, an information processing method and information processing apparatus for decrypting an encrypted image, a program, and a storage medium.

BACKGROUND ART

Conventionally, entire image data undergoes encryption, scrambling, or the like to transfer image data or the like in secrecy. This is a technique for encrypting entire image data using an encryption key, and allowing only a party who has a decryption key corresponding to the encryption key to normally decrypt the encrypted image data.

Especially, image data having a hierarchical structure undergoes an encryption process using different encryption keys for respective layers for the purpose of controlling reproduction of the image data in correspondence with the hierarchical structure. Also, image data made up of a plurality of tiles undergoes an encryption process using different encryption keys for respective tiles for the purpose of controlling reproduction for respective tiles. Furthermore, when image data is made up of a plurality of tiles, and each tile has a hierarchical structure, the image data undergoes an encryption process using different encryption keys for respective layers in each tile for the purpose of controlling reproduction of the image data in correspondence with each tile and hierarchical structure.

When image data is encrypted using different encryption keys for respective tiles and layers to be controlled, reproduction of the image data can be controlled for each tile and hierarchical structure. However, in order to decrypt a predetermined tile and layer of encrypted image data, all the encryption keys used in the encryption process must be managed, and an appropriate decryption key must be supplied upon decryption.

When reproduction of a predetermined tile and layer of the encrypted image data is permitted, unpermitted tiles and layers of the image data remain encrypted. Such image data with the encrypted tiles and layers is reproduced like a noise signal, and a problem is often posed.

For example, a case will be examined wherein image data having a hierarchical structure associated with resolutions undergoes an encryption process using different keys for low- and high-resolution components, and image reproduction control corresponding to a resolution is made. When it is permitted to browse a low-resolution image, but it is not permitted to browse a high-resolution image, the low-resolution components are decrypted using the key corresponding to the low-resolution components, and the high-resolution components remain encrypted. In such case, image data obtained by multiplexing noise data of the high-resolution component on the image data of the low-resolution components is reproduced, and the low-resolution image cannot be browsed without being multiplexed with the noise data.

When image data is encrypted using different encryption keys for respective tiles and layers, there is no means for determining correspondence between encrypted predetermined tiles and layers, and decryption keys required to decrypt them. For this reason, a decryption process cannot often be normally made. Likewise, when some tiles or layers of image data are encrypted, it is difficult to discriminate encrypted tiles and layers from those which are not encrypted, and a decryption process cannot often be normally made.

The present invention has been made in consideration of the above problems, and has as its object to allow easy management of keys used in encryption.

DISCLOSURE OF INVENTION

In order to achieve the above object, for example, an information processing method of the present invention comprises the following arrangement.

That is, an information processing method characterized by comprising:

a first recognition step of recognizing a first unit n (n=1 to N) which specifies segmentation of encoded image data;

a second recognition step of recognizing a second unit m (m=1 to M) which specifies segmentation of encoded image data;

a first parameter generation step of generating a first parameter $X_n$ (n=1 to N) on the basis of the first unit n; and a key parameter generation step of generating a key parameter corresponding to each combination (n, m) of the first and second units on the basis of at least the first parameter, and in that the key parameter is used to encrypt or decrypt partial encoded image data D(n, m) corresponding to the combination (n, m) in the encoded image data, and the first parameter generation step includes a step of generating each first parameter $X_n$ on the basis of an algorithm which uniquely determines the first parameter $X_n$ based on a neighboring first parameter $X_{n-1}$.

In order to achieve the above object, for example, an information processing apparatus of the present invention comprises the following arrangement.

That is, an information processing apparatus characterized by comprising:

first recognition means for recognizing a first unit n (n=1 to N) which specifies segmentation of encoded image data;

second recognition means for recognizing a second unit m (m=1 to M) which specifies segmentation of encoded image data;

first parameter generation means for generating a first parameter $X_n$ (n=1 to N) on the basis of the first unit n; and key parameter generation means for generating a key parameter corresponding to each combination (n, m) of the first and second units on the basis of at least the first parameter, and in that the key parameter is used to encrypt or decrypt partial encoded image data D(n, m) corresponding to the combination (n, m) in the encoded image data, and the first parameter generation means generates each first parameter $X_n$ on the basis of an algorithm which uniquely determines the first parameter $X_n$ based on a neighboring first parameter $X_{n-1}$.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 2 is a block diagram showing the functional arrangement of an image encoding unit 11;

FIG. 8 is a view for explaining an example of a key ID generation method;

FIG. 10 shows an example of the format of an ID reference table according to the first embodiment of the present invention;

FIG. 18 is a block diagram showing the functional arrangement of a decryption apparatus (decryption system) according to the fifth embodiment of the present invention;

BEST MODE FOR CARRYING OUT THE INVENTION

Preferred embodiments of the present invention will now be described in detail in accordance with the accompanying drawings.

First Embodiment

An encryption apparatus according to this embodiment for encrypting an image, and a decryption apparatus for decrypting an image encrypted by the encryption apparatus will be described below.

<Encryption Apparatus>

Figure 1:
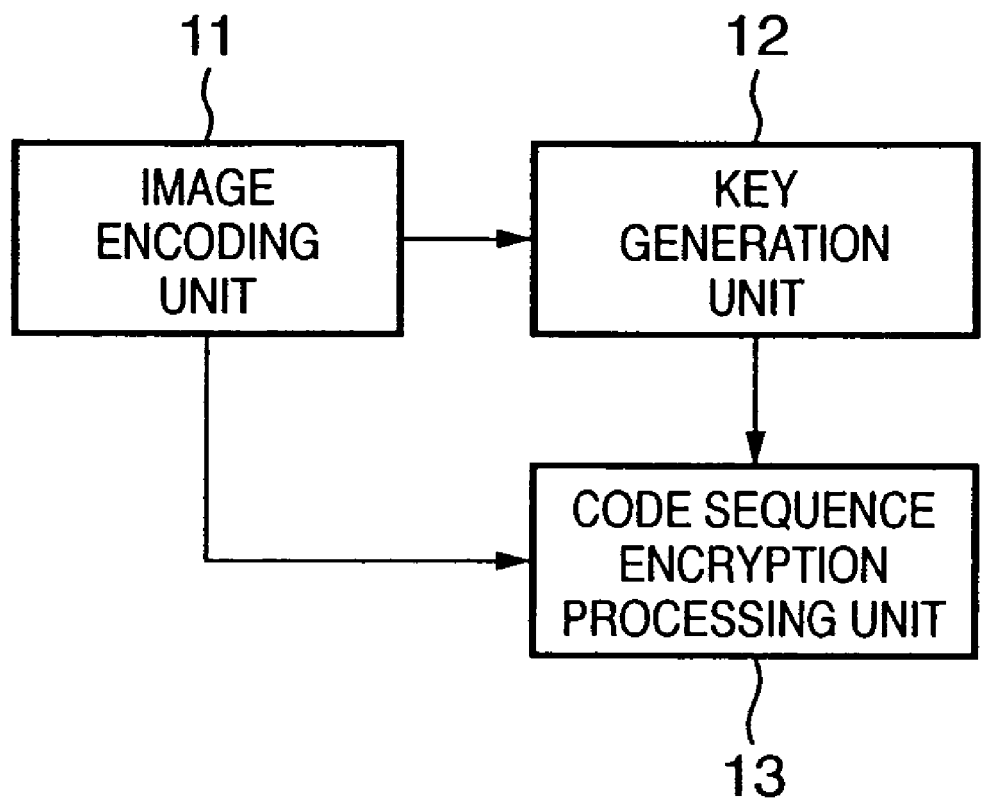
FIG. 1 is a schematic block diagram showing the functional arrangement of an encryption apparatus according to the first embodiment of the present invention.

FIG. 1 is a schematic block diagram showing the functional arrangement of an encryption apparatus according to this embodiment. As shown in FIG. 1, the encryption apparatus according to this embodiment comprises an image encoding unit 11, key generation unit 12, and code sequence encryption processing unit 13. Note that an encryption process to be described below may be executed by a computer which loads software with this arrangement (computer program). In this case, FIG. 1 corresponds to a block diagram that shows the functional arrangement of a program that makes a computer execute the encryption process according to this embodiment.

In the arrangement shown in FIG. 1, when an image signal is input to the image encoding unit 11, the image encoding unit 11 executes an encoding process (to be described later) for this image signal, and outputs a code sequence as an encoding result to the code sequence encryption processing unit 13. Furthermore, the image encoding unit 11 outputs at least one of encoding parameters used in the encoding process to the key generation unit 12.

The encoding process executed by the image encoding unit 11 will be described in more detail below. FIG. 2 is a block diagram showing the functional arrangement of the image encoding unit 11. As shown in FIG. 2, the image encoding unit 11 according to this embodiment comprises an image input unit 21, tile segmentation unit 22, discrete wavelet transformer 23, quantizer 24, entropy encoder 25, and code output unit 26.

Pixel signals which form an image to be encoded are input to the image input unit 21 in the raster scan order, and the output from the image input unit 21 is input to the tile segmentation unit 22. In the following description, an image signal expresses a monochrome multi-valued image. However, when a plurality of color components of, e.g., a color image or the like are to be encoded, each of R, G, and B color components or each of luminance and chromaticity components may be compressed as the monochrome component.

The tile segmentation unit 22 segments the input image signal into at least one tile having a predetermined size, and outputs the segmented tile or tiles. Note that the tiles indicate rectangular regions which do not overlap each other, and the subsequent processes are independently executed for each tile.

Figure 3A:
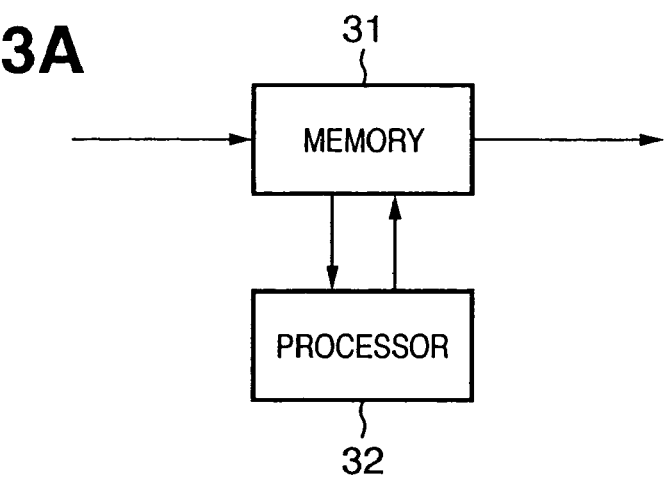
FIG. 3A is a block diagram showing the basic arrangement of a discrete wavelet transformer 23.
Figure 3B:
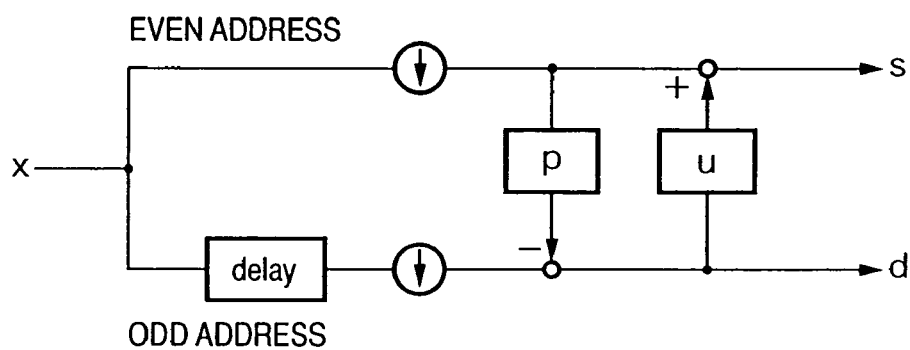
FIG. 3B is a diagram showing the arrangement of processes in a processor 32.
Figure 3C:
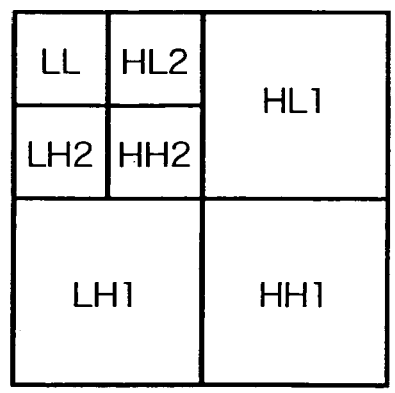
FIG. 3C shows an example of the format of two levels of transform coefficient groups obtained by a two-dimensional (2D) transformation process.

The discrete wavelet transformer 23 executes a two-dimensional wavelet transformation process for the input image signal, and computes and outputs transform coefficients. FIG. 3A shows the basic arrangement of the discrete wavelet transformer 23. An input image signal is stored in a memory 31, is sequentially read out by a processor 32 to undergo the transformation process, and is written in the memory 31 again. In this embodiment, FIG. 3B shows the arrangement of processes in the processor 32. Referring to FIG. 3B, an input image signal is separated into odd and even address signals by a combination of a delay element and down samplers, and these signals undergo filter processes of two filters p and u. In FIG. 3B, s and d represent low- and high-pass coefficients upon decomposing a linear image signal to one level, and are respectively computed by:

$$d(n)=x(2n+1)-\text{floor}((x(2n)+x(2n+2))/2) \quad (1)$$

$$s(n)=x(2n)+\text{floor}((d(n-1)+d(n))/4) \quad (2)$$

where x(n) is an image signal to be transformed. With the aforementioned process, a linear discrete wavelet transformation process is done for the image signal. Two-dimensional discrete wavelet transformation is implemented by sequentially executing linear transformation in the horizontal and vertical directions of an image. Since details of this process are known to those who are skilled in the art, a description thereof will be omitted. FIG. 3C shows transform coefficient groups of two levels obtained by the two-dimensional discrete wavelet transformation process. An image signal is decomposed into coefficient sequences HH1, HL1, LH1, . . . , and LL in different frequency bands. Note that these coefficient sequences will be referred to as subbands hereinafter. The coefficient data of the individual subbands are output to the quantizer 24.

The quantizer 24 quantizes the input coefficients by a predetermined quantization coefficient, and outputs indices corresponding to the quantized values. In this case, quantization is described by:

$$q=\text{sign}(c)\,\text{floor}(\text{abs}(c)/\Delta) \quad (3)$$

$$\text{sign}(c)=1;\; c\geq 0 \quad (4)$$

$$\text{sign}(c)=-1;\; c<0 \quad (5)$$

where c is a coefficient to be quantized. In this embodiment, the value $\Delta$ includes "1". When $\Delta=1$, no quantization is done in practice, and subbands input to the quantizer 24 are directly output to the entropy encoder 25.

The entropy encoder 25 decomposes the input quantization indices into bit planes, executes binary arithmetic coding for respective bit planes, and outputs a code stream.

Figure 4:
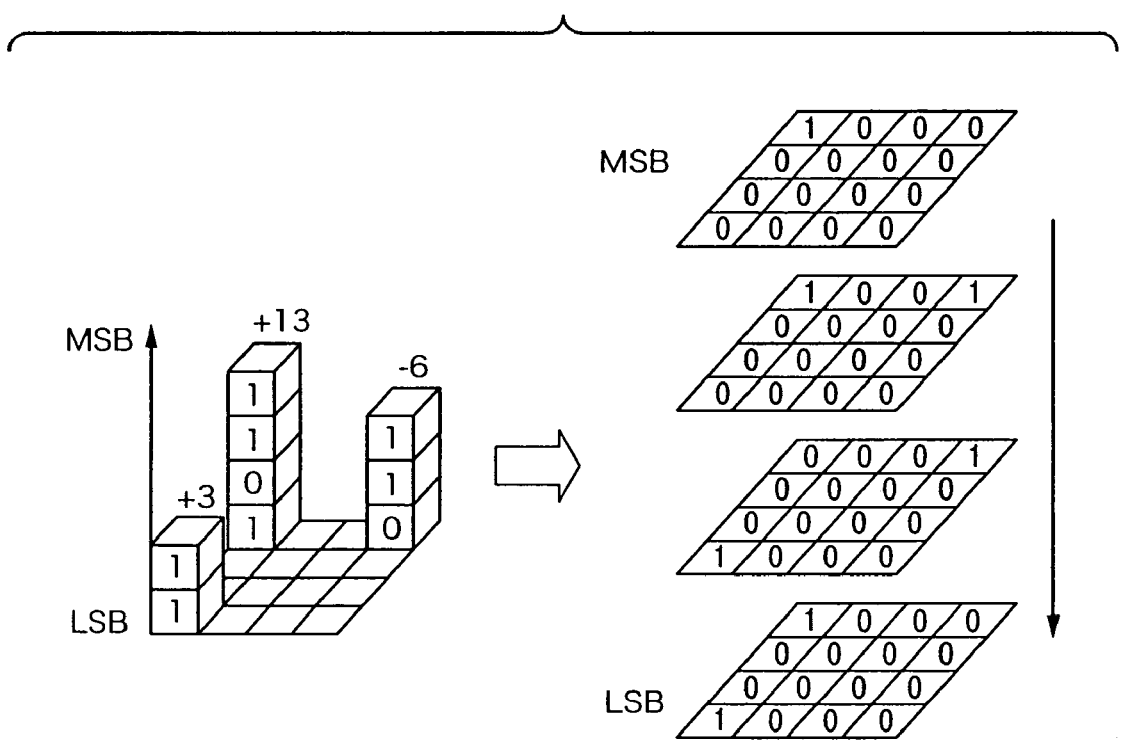
FIG. 4 is a view for explaining the operation of an entropy encoder 25.

FIG. 4 is a view for explaining the operation of the entropy encoder 25. In this example, a 4×4 code block region includes three nonzero quantization indices, which respectively have values "+13", "−6", and "+3". The entropy encoder 25 scans this region to obtain a maximum value M, and computes the number S of bits required for expressing the maximum quantization index by:

$$S=\text{ceil}(\log 2(\text{abs}(M))) \quad (6)$$

where ceil(x) is the smallest one of integers equal to or larger than x. In FIG. 4, since the maximum value is "13", S=4. Hence, 16 quantization indices in the sequence are processed for respective four bit planes, as shown in the right side in FIG. 4. The entropy encoder 25 makes entropy encoding (binary arithmetic encoding in this embodiment) of bits of the most significant bit plane (indicated by MSB in FIG. 4) first, and outputs the encoding result as a bitstream. Then, the encoder 25 lowers the bit plane by one level, and encodes and outputs bits in each bit plane to the code output unit 26 until the bit plane of interest reaches the least significant bit plane (indicated by LSB in FIG. 4). In the entropy encoding, as for the sign of each quantization index, when a nonzero bit to be encoded first (most significant bit) is detected upon scanning from the upper to lower bit planes, one bit indicating the sign of the quantization index of interest is added immediately after the nonzero bit and undergoes binary arithmetic encoding. In this manner, the sign of a nonzero quantization index can be efficiently encoded.

The aforementioned processes are repeated for all tiles. That is, the processes in the discrete wavelet transformer 23, quantizer 24, and entropy encoder 25 are executed for respective tiles.

The code sequence generated by the aforementioned encoding process is input to the code output unit 26, which outputs this code sequence to the code sequence encryption processing unit 13. The code output unit 26 also outputs encoding parameters used in the encoding process (e.g., discrete wavelet transformation levels, filter types, and the like) to the key generation unit 12. P represents the encoding parameters input to the key generation unit 12.

Figure 5:
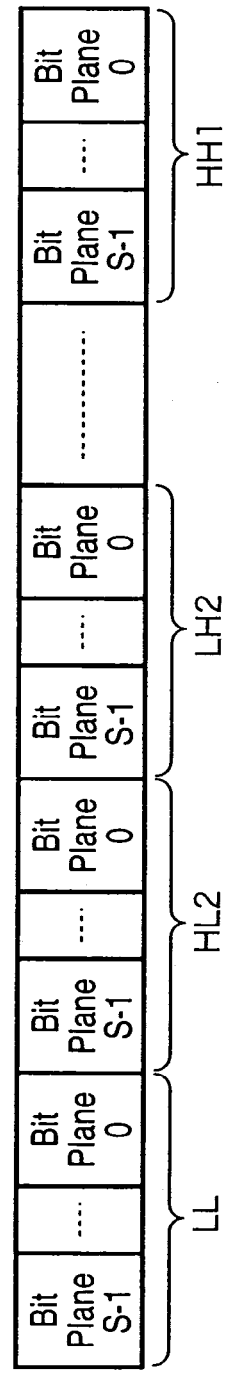
FIG. 5A is a schematic view showing the format of a code sequence.
FIG. 5B is a schematic view showing the format of a code sequence.
FIG. 5C is a schematic view showing the format of a code sequence.
FIG. 5D is a schematic view showing the format of a code sequence.

FIGS. 5A, 5B, 5C, and 5D show the format of the code sequence which is generated and output in this way. FIG. 5A shows the overall format of the code sequence, in which MH is a main header; TH, a tile header; and BS, a bitstream. As shown in FIG. 5B, main header MH is comprised of the size (the numbers of pixels in the horizontal and vertical directions) of an image to be encoded, the size of each tile upon breaking up the image into tiles as a plurality of rectangular regions, the number of components indicating the number of color components, the size of each component, and component information indicating bit precision.

FIG. 5C shows the format of tile header TH. Tile header TH consists of a tile length including the bitstream length and header length of the tile of interest, and an encoding parameter for the tile of interest. The encoding parameter includes a discrete wavelet transformation level, filter type, and the like. FIG. 5D shows the format of bitstream BS of each tile. In FIG. 5D, a bitstream is formed for respective subbands, which are arranged in turn from a subband having a low resolution in ascending order of resolution. Furthermore, in each subband, codes are set for respective bit planes, i.e., in the order from an upper bit plane (MSB) to a lower bit plane (LSB). With this code arrangement, hierarchical decoding corresponding to resolutions shown in FIGS. 23A and 23B (to be described later) can be realized.

The process to be executed by the key generation unit 12 will be described in more detail below. The key generation unit 12 receives some encoding parameters from the code output unit 26, as described above. The key generation unit 12 generates at least one key using the input encoding parameters, and outputs the generated key to the code sequence encryption processing unit 13.

Figure 6:
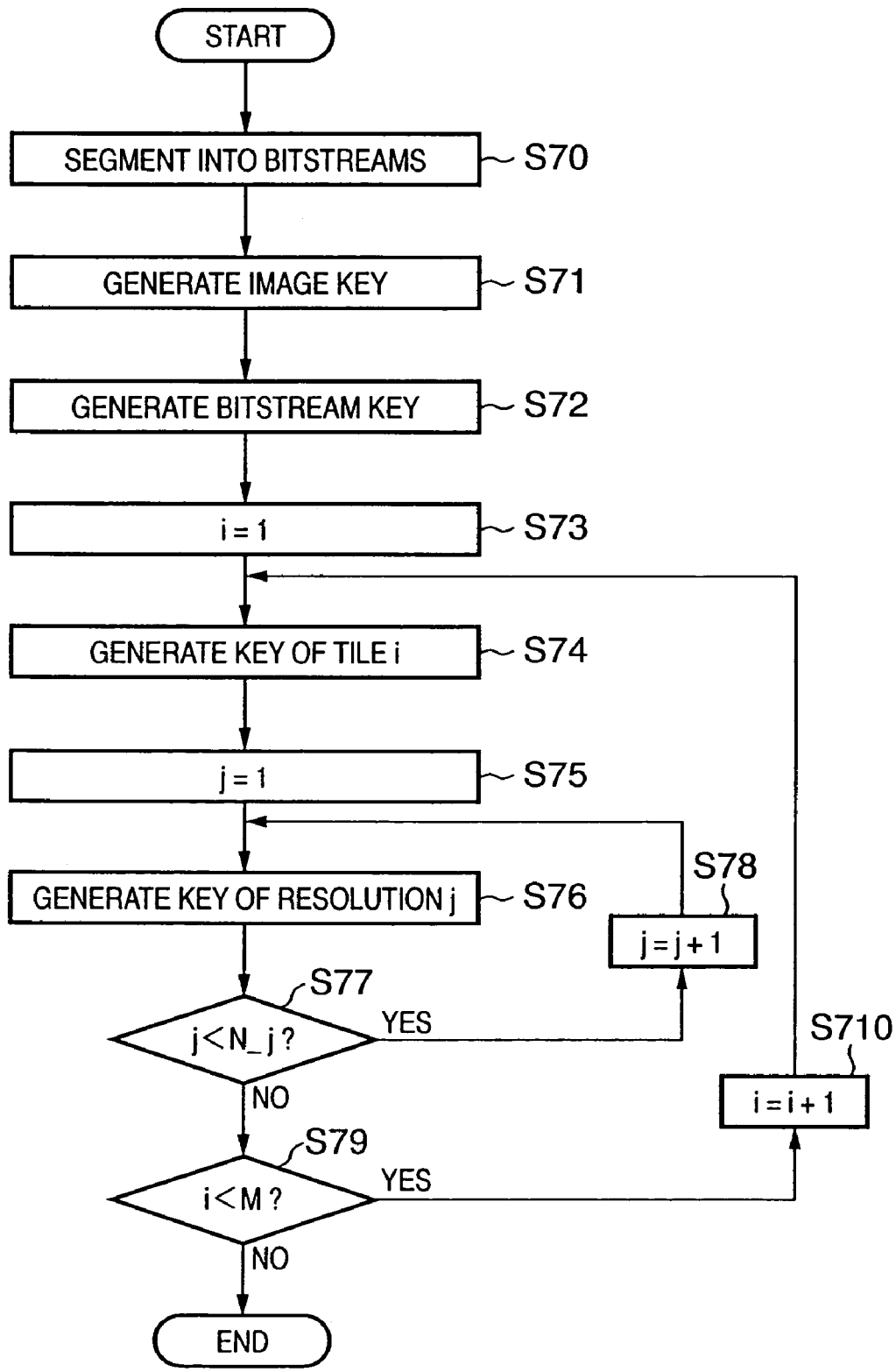
FIG. 6 is a flow chart of a key generation process executed by a key generation unit 12 according to the first embodiment of the present invention.

FIG. 6 is a flow chart showing the key generation process executed by the key generation unit 12. This process will be explained below using FIG. 6.

Figure 7:
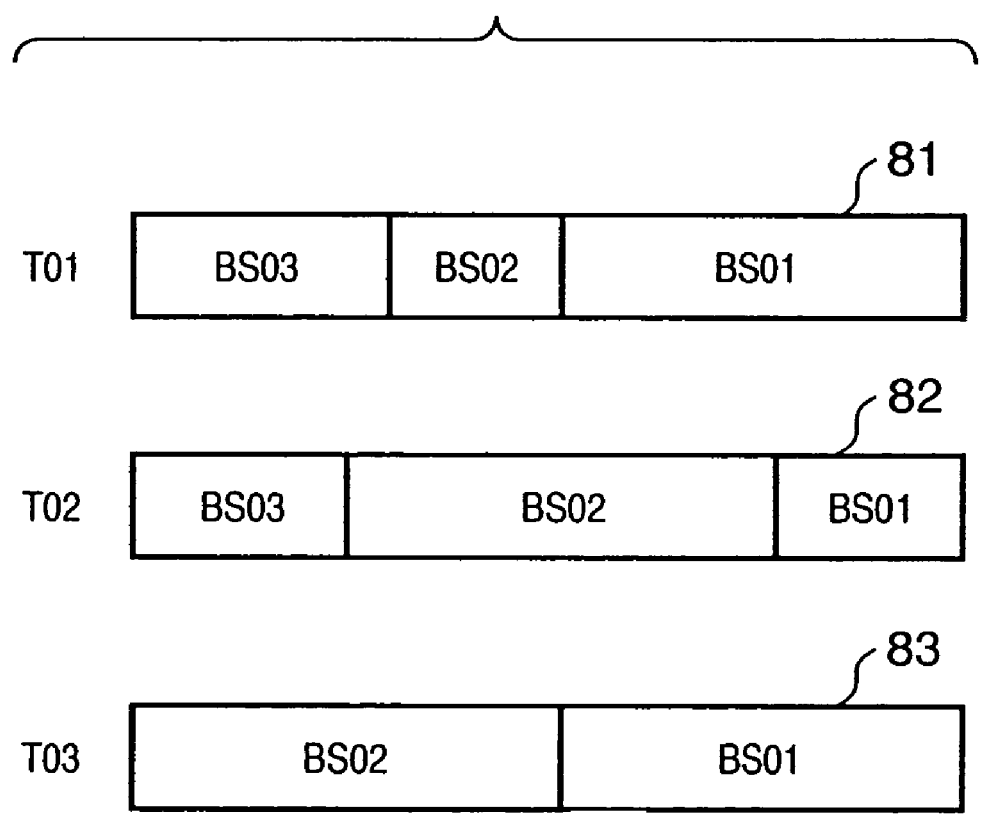
FIG. 7 shows an example of three tiles (T01, T02, and T03) which are respectively segmented into different numbers of bitstreams.

In the code sequence output from the code output unit 26, a bitstream of each tile is segmented into a plurality of bitstreams (step S70). FIG. 7 shows an example of segmentation in step S70. FIG. 7 shows an example of three tiles (T01, T02, and T03) which are segmented into different numbers of bitstreams.

In FIG. 7, reference numeral 81 denotes an example in which the bitstream which forms tile T01 is segmented into three bitstreams BS03, BS02, and BS01. In this embodiment, since a bitstream has a hierarchical structure corresponding to resolutions, bitstreams BS03, BS02, and BS01 respectively correspond to those obtained by segmenting bitstreams of subbands contained in the bitstream which forms tile T01 into three groups (e.g., bitstream BS03 contains that of LL subband, bitstream BS02 contains those of HL2, LH2, and HH2 subbands, and bitstream BS01 contains those of HL1, LH1, and HH1 subbands).

Therefore, when BS03 is decoded, a low-resolution image can be reproduced. When BS02 is decoded in turn, an image having a higher resolution can be reproduced. When BS01 is decoded finally, an image having the highest resolution can be reproduced. Note that a numeral that follows BS indicates a resolution index.

In FIG. 7, reference numeral 82 denotes an example in which the bitstream which forms tile T02 is segmented into three bitstreams as in T01 but another segmentation method is adopted. Furthermore, reference numeral 83 in FIG. 7 denotes an example in which tile T03 is segmented into two bitstreams. As described above, different bitstream segmentation methods can be independently set for respective tiles. The aforementioned segmentation process may be explicitly designated by the user or may be automatically designated using the number of bitstreams to be segmented, which is determined in advance.

The description will revert to FIG. 6. Upon completion of the bitstream segmentation process of respective tiles, image key K_I is generated (step S71). Image key K_I is the only one key for one image. Hence, in this embodiment, image key K_I is a key for the image to be encoded input to the image input unit 21. The generated image key K_I is saved together with a key ID which is also generated in step S71. The key ID is an index indicating image key K_I. Details of the key ID will be explained later.

Bitstream key K_BS is generated from image key K_I using the encoding parameters P (step S72). For example, bitstream key K_BS is generated using:

$$K\_BS = H(K\_I \| P) \quad (7)$$

where H(·) is a one-way, collision-resistant function. For example, an encryption process such as a hash function, DES, or the like can be applied. Since the encryption process such as a hash function, DES, or the like is a state-of-the-art technique, a detailed description thereof will be omitted. The generated bitstream key K_BS is saved together with a key ID which is also generated in step S72. Also, A∥B represents coujunction of A and B.

Variable i is initialized to 1 (step S73). Variable i is an index indicating a tile. Key K_Ti for tile Ti is generated from bitstream key K_BS using information associated with that tile (step S74). For example, if tile index i is used as information associated with the tile, key K_Ti is generated using:

$$K\_Ti = H(K\_BS \| i) \quad (8)$$

The information associated with the tile is not limited to the tile index. For example, an upper left coordinate value of the tile can be used. The generated tile key K_Ti is saved together with a key ID which is also generated in step S74.

Variable j is initialized to 1 (step S75). Variable j is a resolution index indicating each segmented bitstream described above. The resolution is higher with decreasing j, and vice versa.

In tile Ti, a key for a segmented bitstream indicating each resolution is generated (step S76). More specifically, key K_TiSj of resolution j is generated from key K_Ti of tile Ti. For example, key K_TiSj is generated using:

$$\text{If } j=1, K\_TiSj = K\_Ti$$

$$\text{If } j \neq 1, K\_TiSj = H(K\_TiSj-1) \quad (9)$$

The generated resolution key K_TiSj is saved together with a key ID which is also generated in step S76.

It is then checked if variable j<variable N_i (step S77). Note that parameter N_i is the number of segmented bitstreams which form tile Ti. That is, it is determined whether or not resolution keys K_TiSj corresponding to all (segmented) bitstreams which form tile Ti have been generated. If the checking result is true, the flow advances to step S78 to increment variable j by 1. Then, the aforementioned process in step S76 is executed using incremented variable j. On the other hand, if the checking result in step S77 is false, the flow advances to step S79 to check if variable i<parameter M. Note that parameter M indicates the total number of tiles. That is, it is determined whether or not tile keys K_Ti corresponding to all the tiles have been generated. If the checking result is true, the flow advances to step S710 to increment variable i by 1. Then, the processes in step S74 and subsequent steps are executed using incremented variable i.

Figure 8:
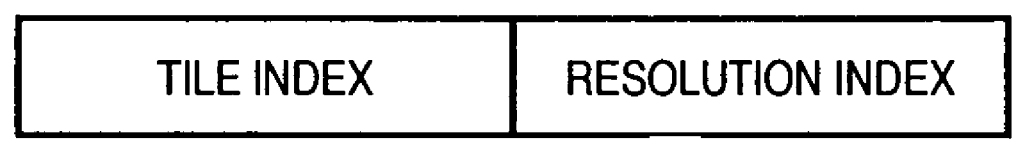

The key ID will be described below. The key ID is an index indicating a key, as described above, and is paired with the key. An example of the key ID generation method will be described below using FIG. 8. FIG. 8 is a view for explaining an example of the key ID generation method. As shown in FIG. 8, the key ID of this embodiment is formed to have a tile index in the former half, and a resolution index in the latter half. For example, if the tile index (i) is "01" and the resolution index (j) is "02", the key ID is "0102".

The key ID and key are associated with each other, and a tile and resolution to be decrypted by the corresponding key can be specified with reference to the key ID. Especially, image key K_IMG may have a key ID "0000", bitstream key K_BS may have a key ID "0001", and respective tile keys may have key IDs "0100", "0200", "0300", . . . . Since the resolution index and tile index are integers equal to or larger than 1, the key IDs are never repetitively used.

Figure 9:
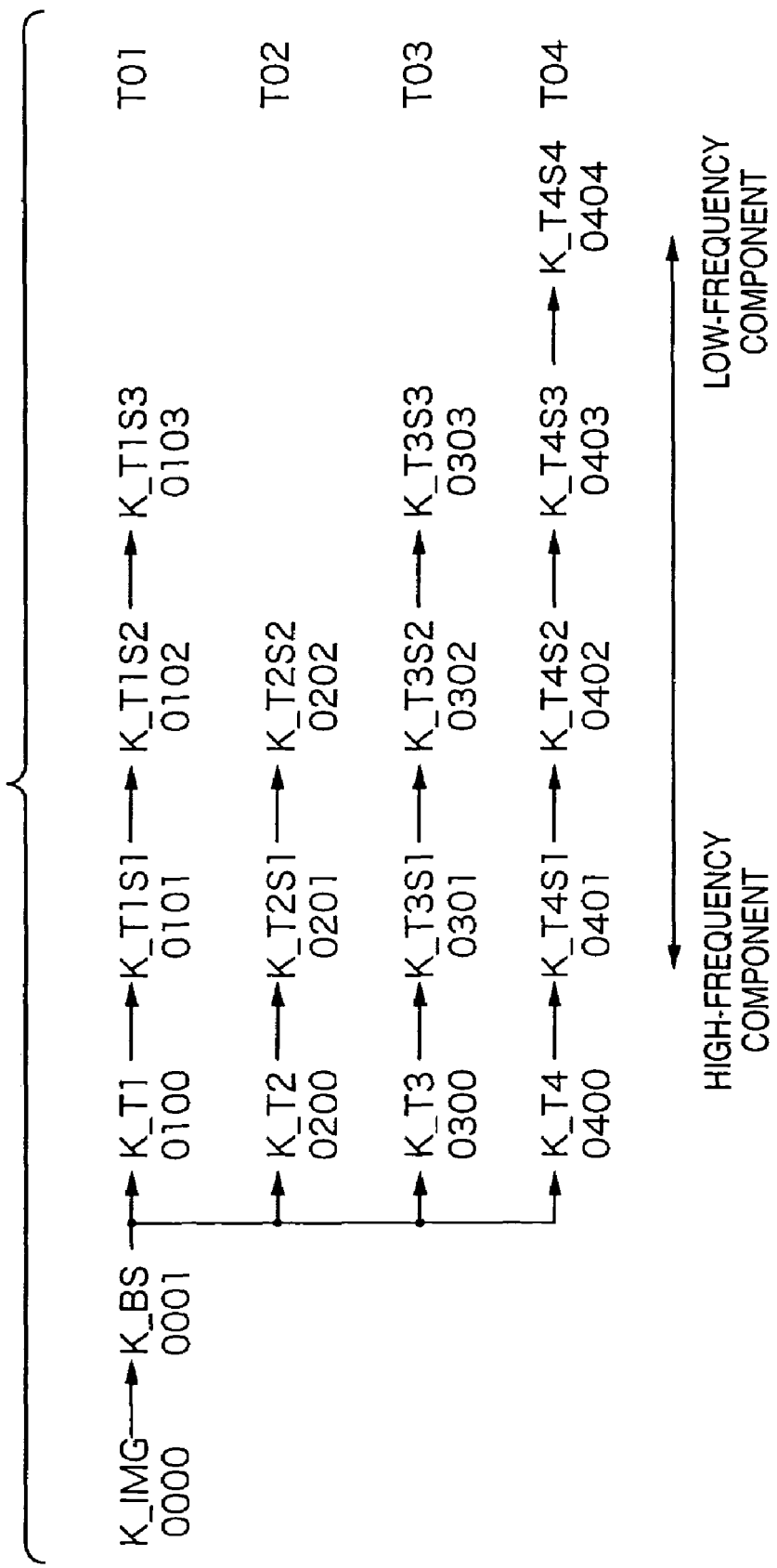
FIG. 9 shows an example of keys and key IDs corresponding to respective tiles and respective resolution levels of each tile when an image is made up of four tiles, tile 01 is made up of three resolution levels, tile 02 is made up of two resolution levels, tile 03 is made up of three resolution levels, and tile 04 is made up of four resolution levels.

The keys and key IDs generated by the aforementioned methods will be explained below using FIG. 9. FIG. 9 shows an example of keys and key IDs corresponding to respective tiles and respective resolution levels of each tile when an image is made up of four tiles, tile 01 is made up of three resolution levels, tile 02 is made up of two resolution levels, tile 03 is made up of three resolution levels, and tile 04 is made up of four resolution levels.

In step S71 above, image key K_IMG and its key ID "0000" are generated. In step S72 above, bitstream key K_BS and its key ID "0001" are generated. In step S74, tile key K_T1 and its key ID "0100", tile key K_T2 and its key ID "0200", tile key K_T3 and its key ID "0300", and tile key K_T4 and its key ID "0400" are generated. In step S76, resolution keys and their key IDs for respective resolutions of each tile are generated. Taking tile 1 as an example, resolution key K1S1 and its key ID "0101", resolution key K1S2 and its key ID "0102", and resolution key K1S3 and its key ID "0103" are generated.

In practice, since each tile key is equal to a resolution key of the highest resolution in each tile (for example, in case of tile 1, K_T1 and K_T1S1), the tile key or the resolution key of the highest resolution may be omitted. Furthermore, in this embodiment, the keys and key IDs have been independently explained for the sake of simplicity. However, in practice, pairs of keys and key IDs in this embodiment can be handled as keys required for decryption.

The aforementioned key ID is used to specify a tile and resolution level encrypted by the key corresponding to it. However, the location of the corresponding tile and resolution level in a bitstream cannot be determined from the key ID. Hence, an ID reference table used to record information indicating the "location of a tile and resolution level corresponding to a given key ID in a bitstream" must be used. The ID reference table will be described below.

FIG. 10 shows an example of the format of the ID reference table according to this embodiment. The ID reference table shown in FIG. 10 is registered with tile information and resolution level information corresponding to each key ID. Using the ID reference table, for example, it is detected that "a key having a key ID "0202" is used to encrypt a period having an offset "12" from the head and a length "9" in a bitstream which forms a tile located at a coordinate position (64, 0) in an image". The ID reference table shown in FIG. 10 is recorded and generated every time a key and its key ID are generated in the key generation process that has been explained using FIG. 7.

In this embodiment, the coordinate position of a tile is used as the tile information, and the offset and length are used as resolution level information. However, the present invention is not limited to such specific information, and various other parameters which can specify each tile and resolution level can be used. Furthermore, information that indicates a specific period in a bitstream may be recorded in place of the tile information and resolution level information.

The ID reference table generated using the aforementioned process must be transmitted to a decryption apparatus (to be described later) by a secure method. For example, the ID reference table may be encrypted or signed, and may be embedded in a code sequence. This is because if the ID reference table has been tampered with, a decryption process cannot be normally executed.

Furthermore, all the keys and key IDs shown in FIG. 9 need not always be saved and securely transmitted to the decryption apparatus. That is, of the keys shown in FIG. 9, only image key K_IMG is securely saved. Upon decryption, a key corresponding to a bitstream which is permitted to be decrypted may be generated from image key K_IMG, and only the generated key may be securely transmitted. In this way, only one key need be securely saved and managed for each image data, and such method is effective in terms of management and efficiency. Details of generation of a key required for decryption will be described later.

The process to be executed by the code sequence encryption processing unit 13 will be described below. The code sequence encryption processing unit 13 receives the code sequence, keys generated by the previous key generation process, and ID reference table. The unit 13 executes an encryption process of the code sequence using the keys and ID reference table, and outputs an encrypted code sequence. More specifically, the location of a bitstream to be encrypted in the code sequence is specified using a key ID corresponding to that bitstream and the ID reference table, and the bitstream located at the specified location is encrypted. For example, a bitstream corresponding to resolution level 2 of tile 1 is encrypted using a key paired with a key ID "0102". Note that the code sequence encryption processing unit 13 does not use image key K_IMG, bitstream key K_BS, and tile keys. That is, the unit 13 executes the encryption process using resolution keys.

Note that the code sequence encryption processing unit 13 need not always encrypt all tiles and resolution levels. For example, lowest-resolution images of all tiles may not be encrypted, or all resolution images of only a given tile may not be encrypted.

Furthermore, as described above, the ID reference table used in the encryption process undergoes an encryption or signature process so as to securely transmit that table to the decryption apparatus. The ID reference table that has undergone the encryption or signature process is embedded in the code sequence, and is transmitted to the decryption apparatus via a network such as a LAN, Internet, or the like.

The arrangement of the encryption apparatus of this embodiment has been explained. In this embodiment, the key generation unit 12 and code sequence encryption processing unit 13 are independently arranged. However, the key generation unit 12 and code sequence encryption processing unit 13 may be integrated. In this case, the encryption process is executed every time each resolution key is generated. That is, the encryption process may be executed simultaneously with generation of a resolution key in step S76.

<Decryption Apparatus (Decryption System)>

Figure 11:
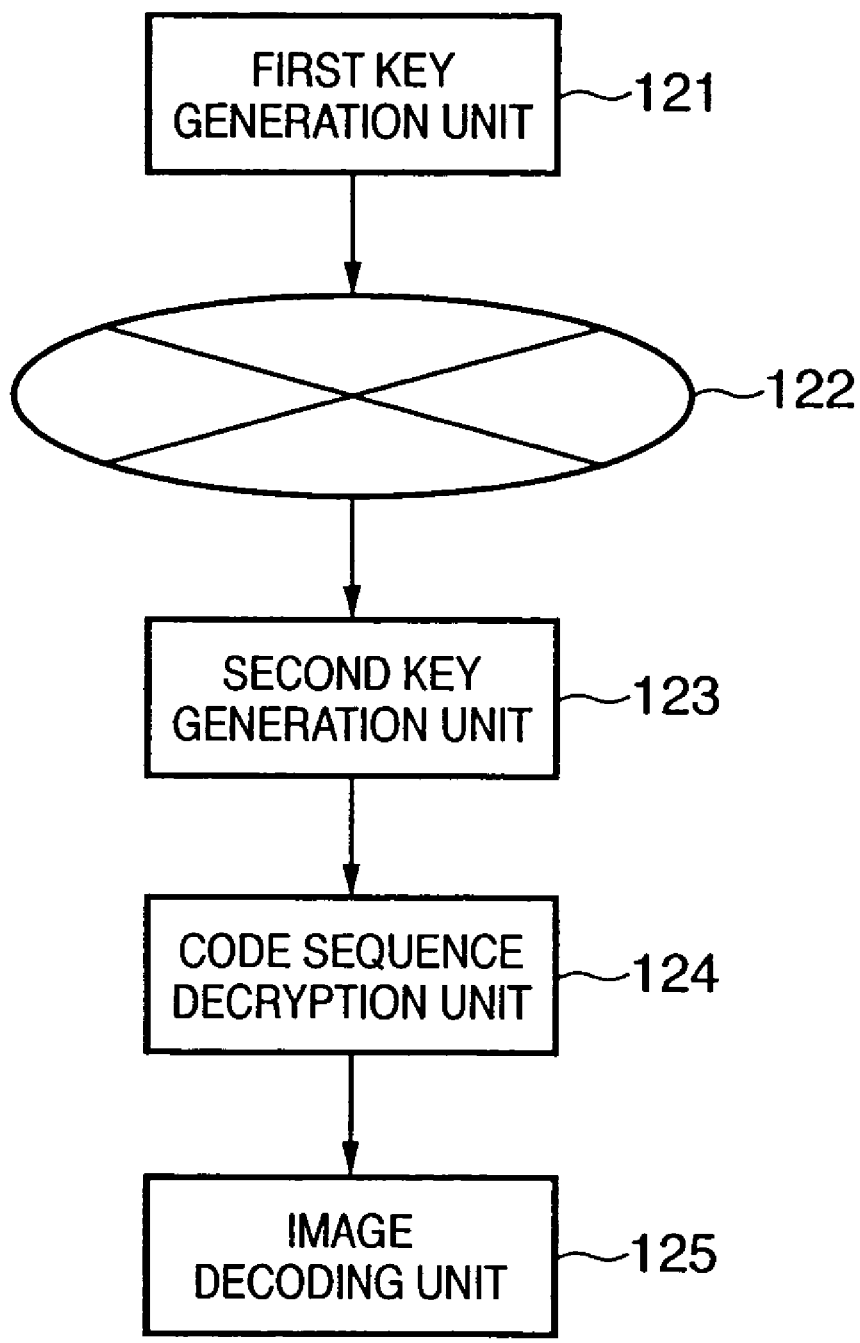
FIG. 11 is a block diagram showing the functional arrangement of a decryption apparatus (decryption system) according to the first embodiment of the present invention.

FIG. 11 is a block diagram showing the functional arrangement of a decryption apparatus (decryption system) according to this embodiment. As shown in FIG. 11, the decryption apparatus according to this embodiment comprises a first key generation unit 121, network unit 122, second key generation unit 123, code sequence decryption unit 124, and image decoding unit 125. Note that the network unit 122 may be omitted. In such case, the decryption apparatus comprises the first key generation unit 121, second key generation unit 123, code sequence decryption unit 124, and image decoding unit 125. Note that the decryption process to be described below may be executed by a computer which loads software with this arrangement (computer program). In this case, FIG. 11 corresponds to a block diagram that shows the functional arrangement of a program that makes a computer execute the decryption process according to this embodiment.

The process to be executed by the first key generation unit 121 will be described first. The first key generation unit 121 receives image key K_IMG and encoding parameters P. The unit 121 generates and outputs a key and key ID corresponding to a bitstream to be decrypted by the code sequence decryption unit 123 (to be described later) using the input encoding parameters P. A first key generation process executed by the first key generation unit 121 is basically the same as the key generation process that has been explained using FIG. 6.

However, the first key generation unit 121 need not always generate all the keys and key IDs unlike in the key generation process that has been explained using FIG. 6, and need only generate a key and key ID corresponding to a bitstream to be decrypted by the code sequence decryption unit 124 (to be described later).

When the entire image is to be decrypted, bitstream key K_BS and its key ID are generated from input image key K_IMG, and only the generated bitstream key K_BS and its key ID are output. When a specific tile alone is to be decrypted, bitstream key K_BS is generated from input image key K_IMG, a tile key corresponding to that specific tile is generated from the generated bitstream key K_BS, and only the generated tile key and its key ID are output. Furthermore, when only a given resolution level of a specific tile is to be decrypted, bitstream key K_BS is generated from input image key K_IMG, a tile key corresponding to that specific tile is generated from the generated bitstream key K_BS, a resolution key corresponding to the required resolution level is generated from the generated tile key, and only the generated resolution key and its key ID are output.

As described above, a key and key ID corresponding to a bitstream to be decrypted are generated using the first key generation unit 121, and the generated key and key ID must be securely transmitted to the subsequent second key generation unit 123 via the network unit 122 (directly to the second key generation unit 123 if the network unit 122 is omitted).

The process executed by the second key generation unit 123 will be described below. The second key generation unit 123 receives the key and key ID output from the aforementioned first key generation unit, generates a decryption key corresponding to a bitstream to be decrypted by the code sequence decryption unit 124 (to be described later), and outputs the generated decryption key. In some cases, a plurality of decryption keys may be generated. A second key generation process executed by the second key generation unit 123 is basically the same as the key generation process that has been explained using FIG. 6. However, the second key generation unit 123 generates another key and key ID to have the key and key ID input to it as a start point in place of generating them to have image key K_IMG as a start point unlike in the key generation process that has been explained using FIG. 6.

Figure 12:
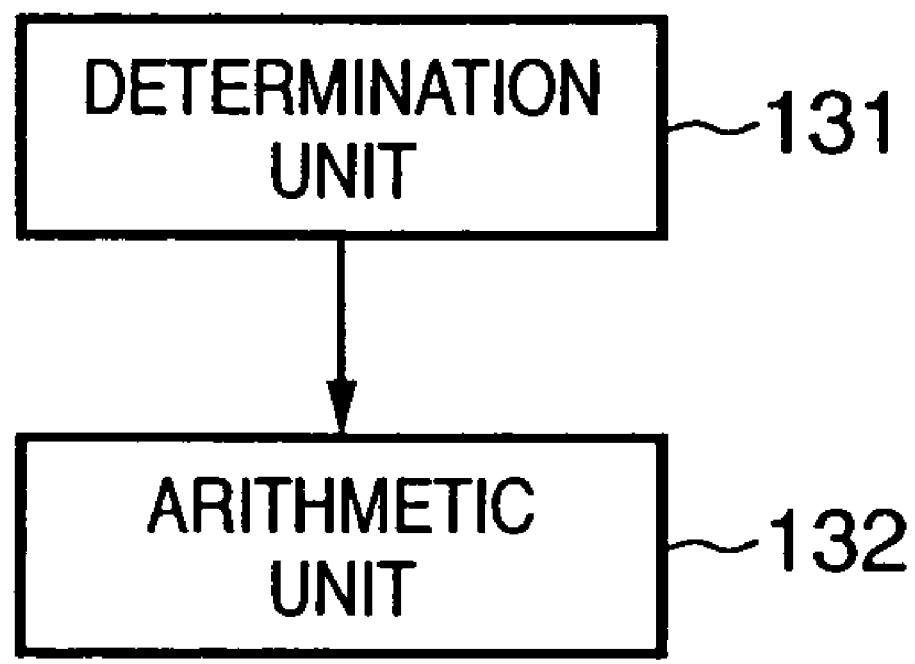
FIG. 12 is a block diagram showing the functional arrangement of a second key generation unit 123 according to the first embodiment of the present invention.

The second key generation process will be described in detail below using FIG. 12. FIG. 12 is a block diagram showing the functional arrangement of the second key generation unit 123. Referring to FIG. 12, the second key generation unit 123 comprises a determination unit 131 and arithmetic unit 132.

The determination unit 131 determines keys that can be generated using the input key ID. If the key ID is "0000", it is determined that the key ID indicates image key K_IMG. From image key K_IMG, all keys (bitstream key, all tile keys, and all resolution keys) can be generated. A case wherein the key ID is "0000" will be referred to as "case A" hereinafter.

If the former half of the key ID is "00", it is determined that the key ID indicates bitstream key K_BS. From bitstream key K_BS, all tile keys and all resolution keys can be generated. A case wherein the former half of the key ID is "00" will be referred to as "case B" hereinafter.

If the latter half of the key ID is "00", it is determined that the key ID indicates a tile key. From the tile key, all resolution keys of bitstreams contained in the corresponding tile can be generated. A case wherein the latter half of the key ID is "00" will be referred to as "case C" hereinafter.

If the key ID does not include "00", it is determined that the key ID indicates a resolution key of a given resolution level of a given tile. From the resolution key of the given resolution level of the given tile, keys for resolutions lower than the resolution level of that key can be generated. A case wherein the key ID does not include "00" will be referred to as "case D" hereinafter.

The arithmetic unit 132 makes the arithmetic operation for the input key on the basis of the determination result, thereby generating keys that can be generated.

For example, in case A, keys are generated by the same process as that in step S72 and subsequent steps in the method shown in FIG. 6. In case B, keys are generated by the same process as that in step S73 and subsequent steps in the method shown in FIG. 6. In case C, keys are generated by the same process as that in steps S75 to S78 in the method shown in FIG. 6. In case D, after the initial value of j is set to be equal to the resolution index included in the input key ID in step S75, keys are then generated by the same process as that in steps S75 to S78.

As described above, the second key generation unit determines keys that can be generated from the key input from the first key generation unit using the key ID input from the first key generation unit, and can generate keys and key IDs used in decryption by executing the arithmetic processes on the basis of the determination result.

The process executed by the code sequence decryption unit 124 will be described below. The code sequence decryption unit 124 receives keys generated by the second key generation unit, and the encrypted code sequence, and executes a decryption process of the code sequence using the keys. The decryption process is executed with reference to the aforementioned ID reference table. That is, a portion encrypted using each input key in a bitstream is specified with reference to the key ID corresponding to that input key, and a bitstream corresponding to that key is decrypted.

Note that the ID reference table may be contained in the code sequence or may be input to the code sequence decryption unit 124 of the decryption apparatus using a secure communication path. If the ID reference table has been encrypted, a decryption process must be executed. If the ID reference table has been signed, a verification process must be executed. When the verification process is normally terminated, the decryption process is executed.

The process executed by the image decoding unit 125 will be described below. The image decoding unit 125 receives the code sequence decrypted by the previous code sequence decryption unit 124, decodes the input code sequence, and outputs decoded image data.

Figure 20:
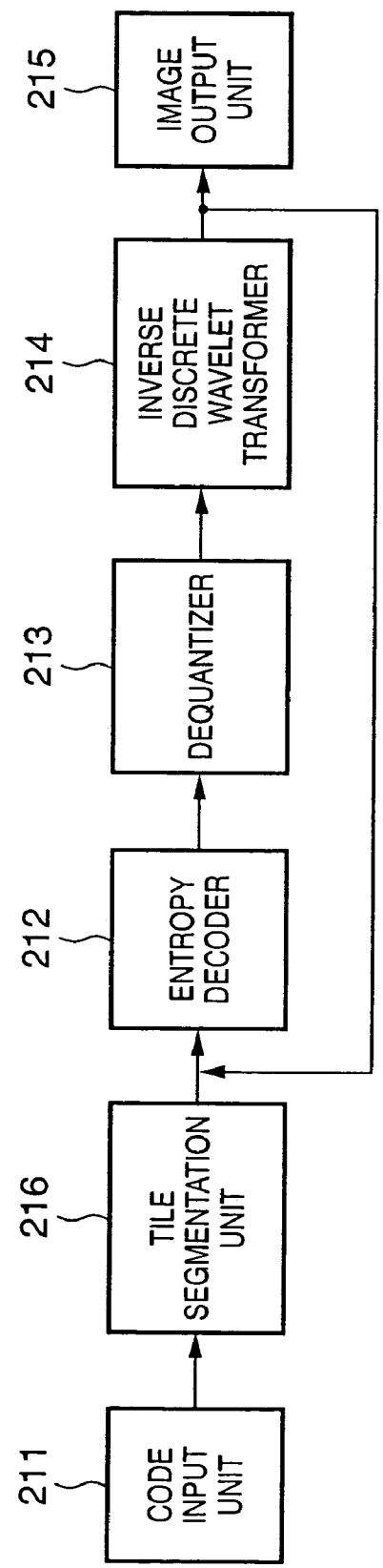
FIG. 20 is a block diagram showing the functional arrangement of an image decoding unit according to the first embodiment of the present invention.

FIG. 20 is a block diagram showing the functional arrangement of the image decoding unit 125. The image decoding unit 125 comprises a code input unit 211, tile segmentation unit 216, entropy decoder 212, dequantizer 213, inverse discrete wavelet transformer 214, and image output unit 215.

The code input unit 211 receives the decrypted code sequence, analyzes the header included in that sequence to extract parameters required for the subsequent processes, and controls the flow of processes if necessary or outputs required parameters to the subsequent processing units. The bitstream included in the code sequence is output to the tile segmentation unit 216.

The tile segmentation unit 216 segments the input bitstream into those corresponding to tiles, and outputs the segmented bitstreams. The tile segmentation process is executed with reference to the main header, tile header, and the like.

After the tile segmentation process, individual bitstreams are output to the entropy decoder 212. Note that the subsequent processes are independently executed for each bitstream obtained by the tile segmentation process.

Figure 21:
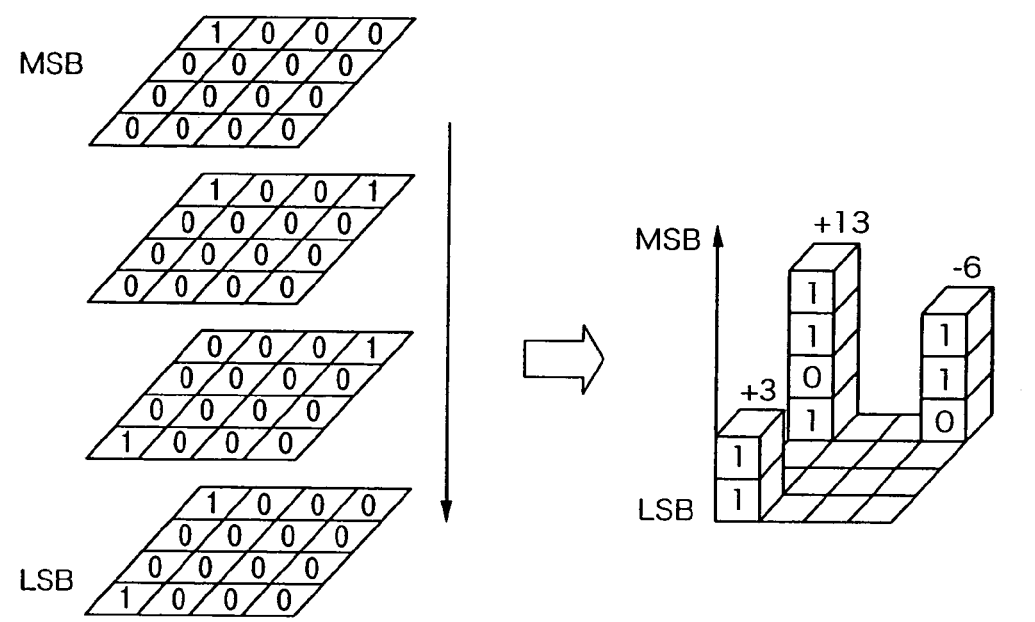
FIG. 21 is a view showing the flow of sequentially decrypting a given region of a subband to be decrypted for respective bit planes and finally reconstructing quantization indices.

The entropy decoder 212 decodes and outputs the bitstreams for respective bit planes. FIG. 21 shows the decoding sequence at that time. FIG. 21 illustrates the flow for sequentially decoding one subband region to be decoded for respective bit planes to finally restore a quantization index, and bit planes are decoded in the order of an arrow in FIG. 21. The restored quantization indices are output to dequantizer 213.

The dequantizer 213 reclaims discrete wavelet transform coefficients from the input quantization indices by:

$$c' = \Delta \times q; \quad q \neq 0 \quad (10)$$

$$c' = 0; \quad q = 0 \quad (11)$$

where q is the quantization index, and $\Delta$ is the quantization step, which is the same value used upon encoding. c' is the restored transform coefficient, which is obtained by restoring a coefficient s or d in encoding. The transform coefficient c' is output to the inverse discrete wavelet transformer 214.

Figure 22A:
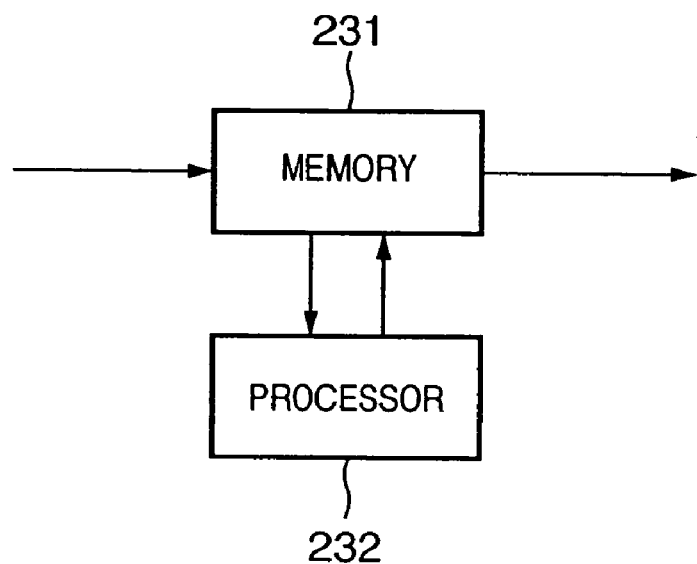
FIG. 22A is a block diagram showing the arrangement and process of an inverse discrete wavelet transformer 214.
Figure 22B:
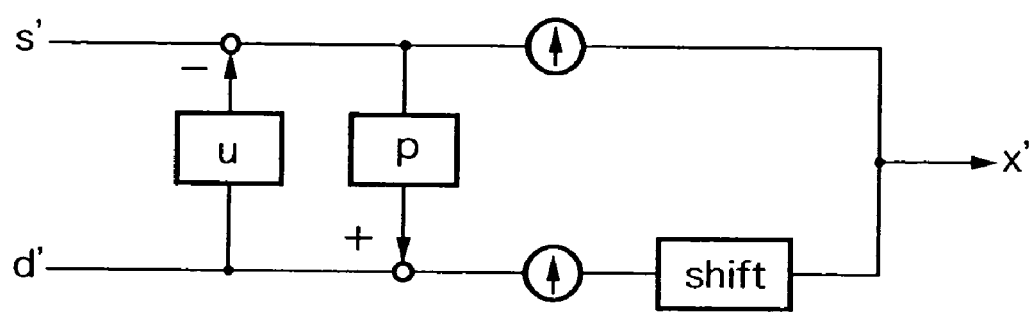
FIG. 22B is a block diagram showing the arrangement and process of an inverse discrete wavelet transformer 214.

FIGS. 22A and 22B are block diagrams showing the arrangement and processes of the inverse discrete wavelet transformer 214. In FIG. 22A, the input transform coefficients are stored in a memory 231. A processor 232 executes linear inverse discrete wavelet transformation, and implements 2D inverse discrete wavelet transformation by sequentially reading out the transform coefficients from the memory 231. The 2D inverse discrete wavelet transformation is executed in a sequence opposite to the forward transformation, but since its details are known to those who are skilled in the art, a description thereof will be omitted. FIG. 22B shows processing blocks of the processor 232. The input transform coefficients undergo two filter processes of filters u and p. The processed transform coefficients are added after up-sampling, thus outputting an image signal x'. These processes are described by:

$$x'(2n) = s'(n) - \text{floor}((d'(n-1) + d'(n))/4) \quad (12)$$

$$x'(2n+1) = d'(n) + \text{floor}((x'(2n) + x'(2n+2))/2) \quad (13)$$

Note that the forward and inverse discrete wavelet transformation processes given by equations (1), (2), (12), and (13) satisfy a perfect reconstruction condition. Hence, since the quantization step $\Delta = 1$ in this embodiment, the restored image signal x' matches an original image signal x if all bit planes are decoded in bit plane decoding.

With the aforementioned process, an image signal is reclaimed and is output to the image output unit 215. Note that the image output unit 215 may be an image display device such as a monitor or the like, or may be a storage device such as a magnetic disk or the like.

Figure 23A:
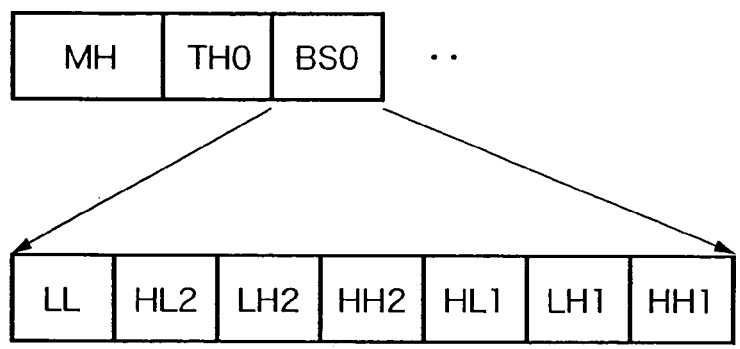
FIG. 23A shows an example of a code sequence.
Figure 23B:
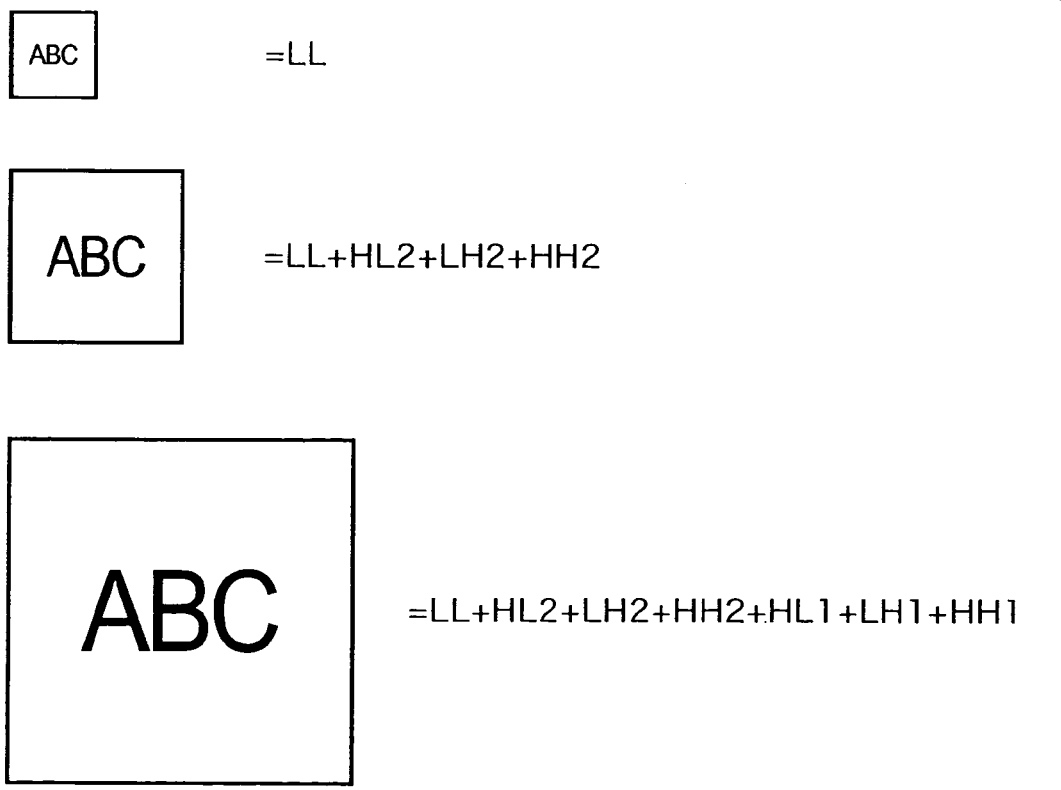
FIG. 23B shows correspondence between respective subbands and the sizes of tiles to be displayed.

The image display pattern upon restoring and displaying an image in the aforementioned sequence will be explained using FIGS. 23A and 23B. FIG. 23A shows an example of a code sequence, the basic format of which is based on FIGS. 5A, 5B, 5C, and 5D. Since an image is made up of a plurality of tiles, the code sequence contains a plurality of tile headers and bitstreams. In bitstream BS0, codes are set in turn from LL as a subband corresponding to the lowest resolution in ascending order of resolution, as shown in FIG. 23A.

The image decoding unit 125 sequentially reads this bitstream, and displays an image upon completion of decoding of codes of each bit plane. FIG. 23B shows correspondence between respective subbands, and the sizes of images to be displayed. In this example, two levels of two-dimensional discrete wavelet transformation processes are done, and when LL alone is decoded and displayed, an image, the numbers of pixels of which are reduced to ¼ in the horizontal and vertical directions with respect to the entire tile, is restored. When bitstreams are further read and all subbands of level 2 are decoded and displayed, an image, the numbers of pixels of which are reduced to ½, is restored. Also, when all subbands of level 1 are decoded, an image having the same number of pixels as that of the entire tile is restored.

Note that data input to the encryption apparatus according to this embodiment is an image signal (before image encoding). However, the present invention is not limited to such specific data, and a code sequence that has already undergone image encoding may be input. In this case, the image encoding unit 11 in FIG. 1 is omitted from the functional arrangement of the encryption apparatus.

With the aforementioned processes, the encryption and decryption processes corresponding to each tile and resolution of an image can be executed. Therefore, when a key corresponding to a tile and resolution permitted by an image administrator is transmitted to a viewer using this embodiment, access control corresponding to the tile and resolution can be implemented. Furthermore, in this embodiment, the administrator need not manage all keys corresponding to tiles and resolutions, and need only manage only one image key (or bitstream key), thus facilitating key management.

Figure 25:
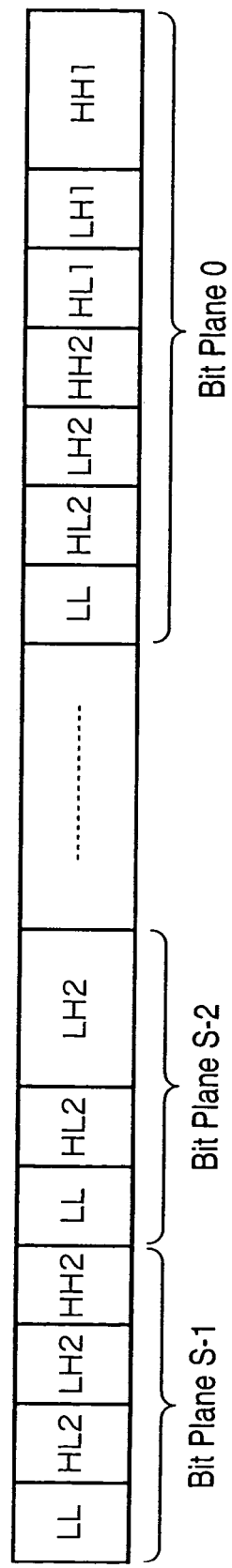
FIG. 25 shows the format of a code sequence in which bit planes are arranged in the order from an upper bit plane to a lower bit plane, and each bit plane contains bitstreams of respective subbands.

Note that this embodiment adopts the format shown in FIG. 5D as that of the bitstream of each tile. This embodiment adopts such format since the respective segmented bitstreams have different resolutions. Alternatively, the respective segmented bitstreams may have different image qualities. In this case, the bitstream may have a format in which bit planes are arranged in the order from upper to lower bit planes, and each bit plane contains bitstreams of respective subbands, as shown in FIG. 25.

Also, when bitstreams for respective bit planes are formed in a bitstream of each tile, and bitstreams for respective subbands are formed in the bitstream of each bit plane, a hierarchical structure based on spatial positions of an image can be realized.

In addition, a hierarchical structure based on luminance components or color components of an image may be realized.

Second Embodiment

In the first embodiment, key generation is done in favor of tiles. That is, when a tile key is used in decryption, all resolution levels of that tile can be decrypted. However, the present invention is not limited to such specific process, and key generation may be done in favor of resolutions. That is, when a resolution key is used in decryption, all tiles of that resolution level can be decrypted. Hence, the process for making key generation in favor of resolutions will be described below.

Figure 13:
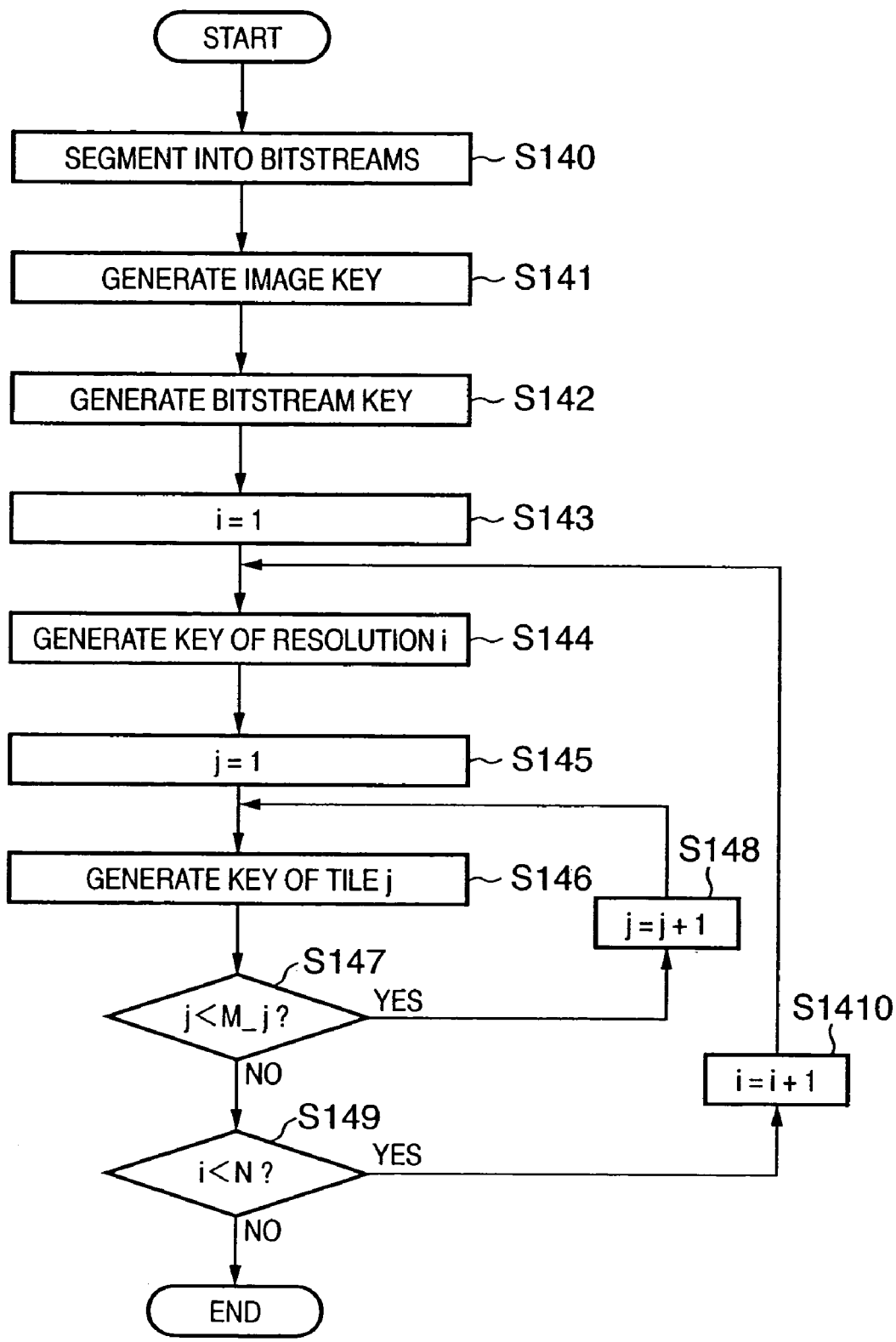
FIG. 13 is a flow chart of a key generation process executed by the key generation unit 12 according to the second embodiment of the present invention.

Note that an encryption apparatus and decryption apparatus according to this embodiment adopt the same the functional arrangements as those of the first embodiment. FIG. 13 is a flow chart of a key generation process executed by the key generation unit 12 according to this embodiment.

The processes in steps S140 to S143 are the same as those in steps S70 to S73, and a description thereof will be omitted.

By the processes in steps S140 to S143, an image key and its key ID, and a bitstream key and its key ID are generated, and variable i is initialized to 1. Then, key K_Si of resolution i is generated from bitstream key K_BS (step S144). For example, key K_Si is generated by:

If $i=1$, $K\_Si=K\_BS$

If $i \ne 1$, $K\_Si=H(K\_Si-1)$ (14)

The generated resolution key K_Si is saved together with its key ID. Variable j is then initialized to 1 (step S145). Variable j is an index indicating a tile. Key K_TjSi of tile j is generated from key K_Si of resolution i (step S146). For example, key K_TjSi is generated by:

$K\_TjSi=(K\_Si\|j)$ (15)

The generated tile key K_TjSi is saved together with a key ID which is also generated in step S146. It is then checked if variable j<parameter M_i (step S147). Note that parameter M_i is the total number of tiles. That is, it is determined whether or not tile keys K_TjSi corresponding to all tiles of resolution i have been generated. If the checking result is true, the flow advances to step S148 to increment variable j by 1 (step S148), and the process in step S146 is executed. On the other hand, if the checking result in step S147 is false, the flow advances to step S149 to check if variable i<parameter N (step S149). Note that parameter N is the number of resolution levels. That is, it is determined whether or not resolution keys K_Si corresponding to all resolution levels have been generated. If the checking result is true, the flow advances to step S1410, and the processes in step S144 and subsequent steps are executed. On the other hand, if the checking result is false, the process ends.

Figure 24:
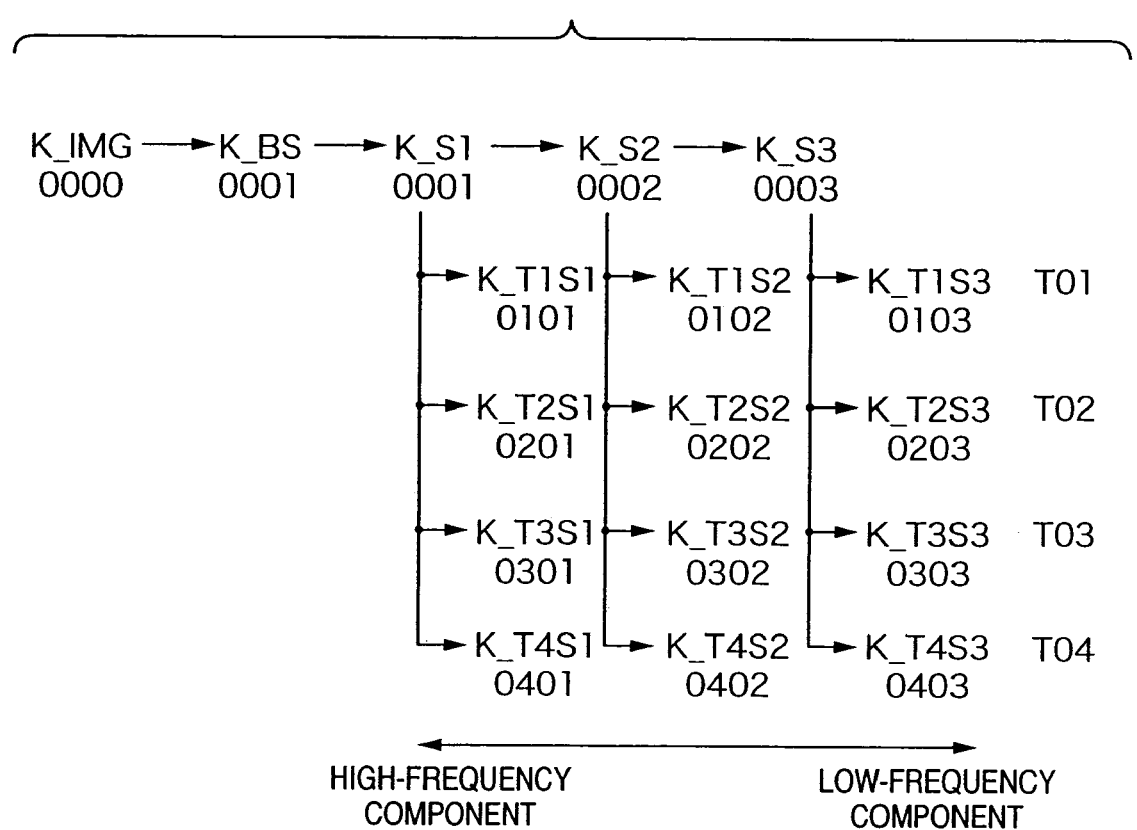
FIG. 24 shows an example wherein an image is made up of four tiles, and each tile has three resolution levels.

A set of keys and key IDs generated by the aforementioned process will be described below using FIG. 24. FIG. 24 shows an example wherein an image is made up of four tiles, and each tile has three resolution levels.

In step S141, image key K_IMG and its key ID "0000" are generated. In step S142, bitstream key K_BS and its key ID "0001" are generated. In step S144, resolution key K_S1 and its key ID "0001", resolution key K_S2 and its key ID "0002", and resolution key K_S3 and its key ID "0003" are generated. In practice, since bitstream key K_BS is equal to resolution key K_S1 of the highest resolution, the bitstream key or resolution key K_S1 of the highest resolution may be omitted.

In step S146, tile keys and their key IDs of respective tiles at each resolution level are generated. Taking resolution level 1 as an example, tile key K_T1S1 and its key ID "0101", tile key K_T2S1 and its key ID "0201", tile key K_T3S1 and its key ID "0301", and tile key K_T4S1 and its key ID "0401" are generated.

When a code sequence generated upon applying the aforementioned key generation process in place of that of the first embodiment is input to the decryption apparatus, an image can be decrypted in favor of resolutions. For example, when all tiles of the lowest resolution level are to be decrypted, the first key generation unit may generate key K_S3 and its key ID "0003", and may transmit them to the second key generation unit.

In this embodiment as well, the bitstream may adopt not only the format shown in FIG. 5D but also that shown in FIG. 25.

Third Embodiment

In the first embodiment, the encryption process is executed using different keys for respective tiles or resolution levels of a code sequence. With this process, decryption control for each resolution level or each tile can be implemented. However, the present invention is not limited to such specific process, and predetermined bitstreams in a code sequence may be encrypted using only one encryption key.

Note that the predetermined bitstreams mean those corresponding to predetermined tiles, those corresponding to predetermined subbands, predetermined bit planes (or a layer as a set of some bit planes), or the like. For example, by encrypting only bitstreams corresponding to predetermined tiles, decryption control based on the spatial positions of an image can be implemented. Also, by encrypting only bitstreams corresponding to predetermined subbands, decryption control based on the frequency components of an image can be implemented. Furthermore, by encrypting only predetermined bit planes (or a layer as a set of some bit planes), decryption control based on the image qualities of an image can be implemented.

When only predetermined bitstreams in a code sequence are encrypted using only one key, as described above, a plurality of keys need not be used, but decryption requires information indicating whether or not bitstreams in the code sequence have been encrypted. As such information, the ID reference table shown in FIG. 10 may be modified and used. In this embodiment, information indicating encrypted bitstreams in a code sequence will be referred to as an encryption map. The encryption map will be described below using FIGS. 14A, 14B, and 14C.

Figures 14A, 14B, 14C:
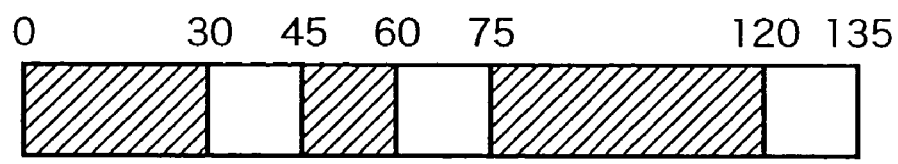
FIG. 14A shows encrypted predetermined bitstreams (halftone dot portions) in a code sequence which has a start point=0 and end point=135.
FIG. 14B shows an example of an encryption map which indicates the locations of the encrypted bitstreams (the bitstreams shown in FIG. 14A) in the code sequence.
FIG. 14C shows another example of an encryption map.

FIG. 14A shows encrypted predetermined bitstreams (halftone dot portions) in a code sequence which has a start point=0 and end point=135. FIG. 14B shows an example of an encryption map which indicates the locations of the encrypted bitstreams (the bitstreams shown in FIG. 14A) in the code sequence. As shown in FIG. 14B, the encryption map according to this embodiment stores an offset from the head of a code sequence, and a length of each encrypted bitstream. With this map, it is determined that period designated by the encryption map is an encrypted bitstream.

FIG. 14C shows another example of the encryption map. As shown in FIG. 14C, the map may indicate the start and end points of each encrypted bitstream. Note that this encryption bit map is included in the code sequence.

Figure 15:
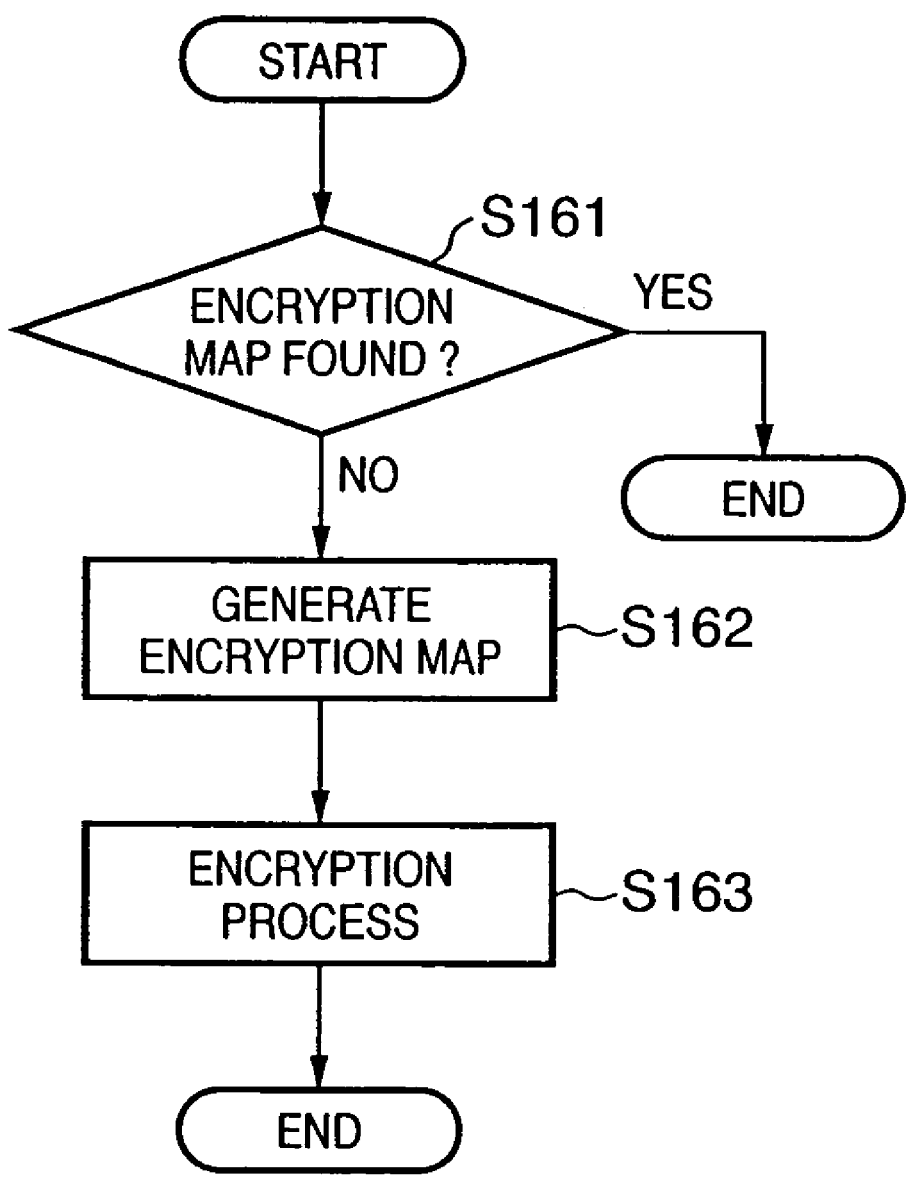
FIG. 15 is a flow chart showing a process executed by a code sequence encryption unit 13 according to the third embodiment of the present invention.

The encryption and decryption processes using the aforementioned encryption map will be described below. The encryption process of this embodiment will be explained first. The encryption process of this embodiment is executed by the encryption apparatus with the arrangement shown in FIG. 1. In this embodiment, the key generation unit 12 is not always required, and can be omitted. Also, since the process executed by the image encoding unit 11 is the same as that explained in the first embodiment, a description thereof will be omitted. The process executed by the code sequence encryption unit 13 will be described below using FIG. 15 which is a flow chart of that process.

It is checked if a code sequence already includes an encryption map (step S161). If an encryption map is already included (true in step S161), the process ends. That is, since the code sequence has already been encrypted, an encryption process is skipped. On the other hand, if an encryption map is not included (false in step S161), the flow advances to step S162. In step S161, if the encryption map has been encrypted, a decryption process is executed. Furthermore, if the encryption map has been signed, a signature verification process is executed. For example, even when the encryption map is found, if a signature is not verified normally, the process ends.

On the other hand, predetermined bitstreams to be encrypted in the code sequence are determined, and an encryption map is generated and saved based on the determined contents (step S162). Note that the predetermined bitstreams to be encrypted may be explicitly designated by the user or may be automatically selected. Then, the predetermined bitstreams in the code sequence are encrypted on the basis of the generated encryption map (step S163).

With the aforementioned process, the encryption map can be generated while preventing double encryption, and an encryption process can be executed.

Figure 16:
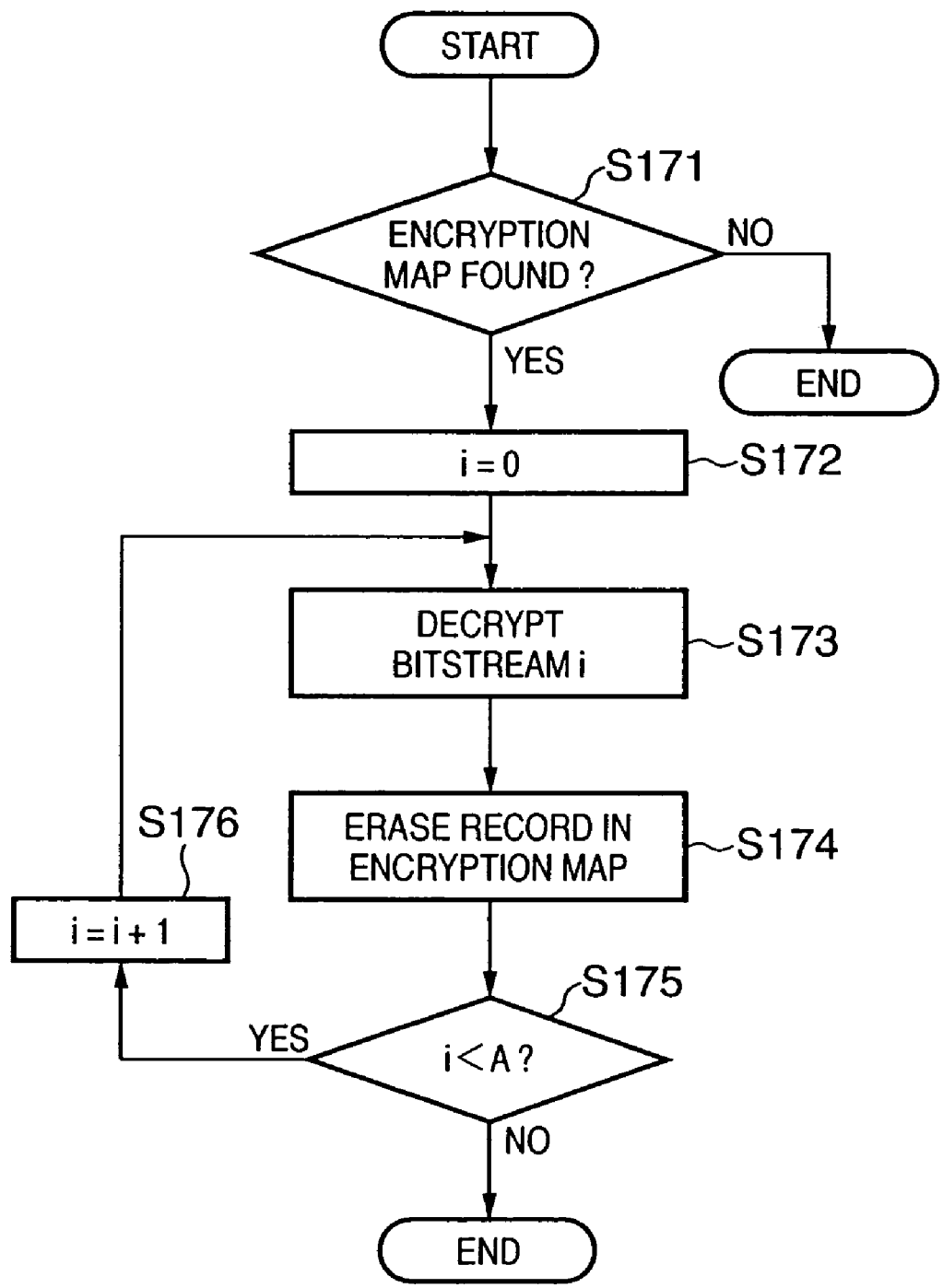
FIG. 16 is a flow chart showing a process executed by a code sequence decryption unit 124 according to the third embodiment of the present invention.

The decryption process of this embodiment will be described below. The decryption process of this embodiment is executed by the decryption apparatus with the arrangement shown in FIG. 11. In this embodiment, however, the first key generation unit 121, network unit 122, and second key generation unit 123 are not always required, and can be omitted. Also, the process executed by the image decoding unit 125 is the same as that described in the first embodiment, and a description thereof will be omitted. The process executed by the code sequence decryption unit 124 will be described below using FIG. 16 which is a flow chart of that process.

It is checked if the code sequence already includes the encryption map (step S171). If no encryption map is found (false in step S171), the process ends. That is, since the code sequence is not encrypted, the encryption process is skipped. On the other hand, if an encryption map is found (true in step S171), the flow advances to step S172. In step S171, if the encryption map has been encrypted, a decryption process is executed. Furthermore, if the encryption map has been signed, a signature verification process is executed. For example, even when the encryption map is found, if a signature is not verified normally, the process ends.

In step S172, variable i is initialized to zero. Variable i is an index indicating one encrypted bitstream in the encryption map. For example, i=0 corresponds to a period having "offset="0", length="30"" in FIG. 14A or a period having "start point="0", end point="60"" in FIG. 14B.

A bitstream designated by variable i is encrypted (step S173). A record of the bitstream designated by variable i in the encryption map is erased (step S174). However, if the decryption process is not normally terminated due to, e.g., use of a wrong key or the like, the record of this bitstream may be left unerased.

It is then checked if variable i<variable A (step S175). Note that variable A is the total number of encrypted bitstreams in the code sequence. For example, in the example shown in FIG. 14A, A="3". That is, it is determined in step S175 whether or not all bitstreams have been decrypted. If the checking result is true, the flow advances to step S176 to increment variable i by 1, and the processes in step S173 and subsequent steps are executed. On the other hand, if the checking result is false, the process ends.

With the above process, the decryption process can be executed while preventing double decryption.

Note that the encryption map may be compressed to allow its efficient recording or transmission. Furthermore, when the encryption map of this embodiment is used, image decoding processes of some encrypted bitstreams may be skipped using the method described in the second embodiment.

In the encryption process, various bitstreams (e.g., bitstreams in respective layer levels) in a code sequence may be encrypted using a plurality of different keys as in the first and second embodiments.

Fourth Embodiment

In the third embodiment, predetermined bitstreams are specified using the encryption map. However, the present invention is not limited to such specific process. For example, an encryption map may be generated to record whether or not each of minimum processing units which form a code sequence is encrypted. Note that the minimum processing unit which forms a code sequence will be referred to as a packet hereinafter. The encryption map of this embodiment will be described below using FIGS. 17A and 17B.

Figure 17A:
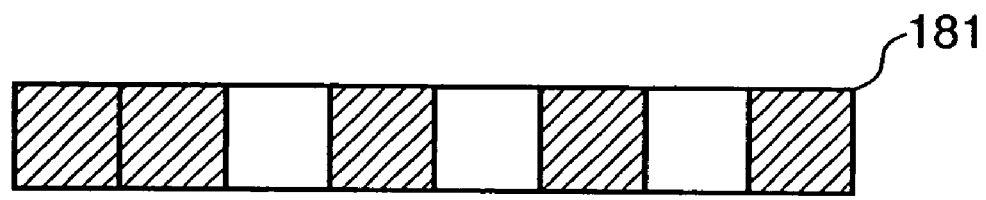
FIG. 17A shows an example of a code sequence which contains encrypted bitstreams.
Figure 17B:
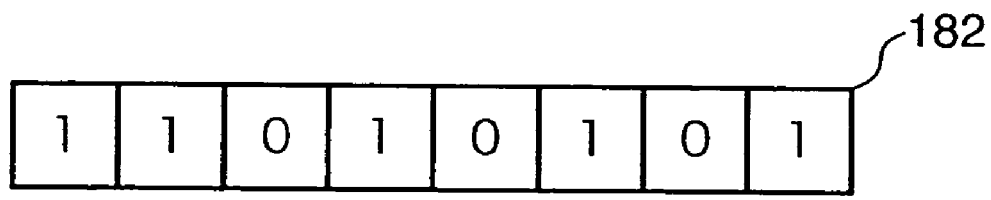
FIG. 17B shows an example of an encryption map for the code sequence shown in FIG. 17A.

In FIG. 17A, reference numeral 181 denotes a part of a code sequence, and one rectangle indicates one packet. Also, hatched packets indicate encrypted ones. In FIG. 17B, reference numeral 182 denotes an example of an encryption map corresponding to the code sequence 181. As shown in FIGS. 17A and 17B, one rectangle in the map 182 corresponds to one packet, and a bit value is assigned to each packet. When a packet is encrypted, a bit value "1" is assigned; when a packet is not encrypted, "0" is assigned.

The encryption map shown in FIG. 17B is generated in the encryption process as in that of the third embodiment. In the decryption process, when packets corresponding to bit values "1" in the encryption map are decrypted, an image can be normally reproduced. For a packet that has undergone the decryption process, "1" is changed to "0", thus preventing double encryption or double decryption.

In this embodiment, the encryption map must be securely transmitted from the encryption apparatus to the decryption apparatus. For this purpose, the encryption apparatus may encrypt the encryption map, and the decryption apparatus may decrypt it. Alternatively, the encryption apparatus may encrypt the encryption map, and the decryption apparatus may verify it.

Note that the encryption map may be compressed to allow its efficient recording or transmission. Furthermore, when the encryption map of this embodiment is used, image decoding processes of some encrypted bitstreams may be skipped using the method described in the second embodiment.

Fifth Embodiment

In the above embodiments, the decryption process is executed with reference to the ID reference table (or encryption map). In this case, a record corresponding to a portion that has undergone the decryption process may be erased from the ID reference table (or encryption map). By erasing records, it is determined by checking only the ID reference table (or encryption map) that portions which have records in the ID reference table (or encryption map) are encrypted, while portions which do not have any record in the ID reference table (or encryption map) are not encrypted.

Note that such process can be executed only when the ID reference table (or encryption map) is securely transmitted from the encryption apparatus to the decryption apparatus. Hence, the ID reference table (or encryption map) must be encrypted by the encryption apparatus before it is transmitted to the decryption apparatus. Alternatively, the ID reference table (or encryption map) may undergo a signature process before it is transmitted to the decryption apparatus.

With the aforementioned process, an already decrypted portion can be prevented from being decrypted again (double decryption). Such double decryption often disturbs normal image decryption even when a correct key is used. Hence, the aforementioned double decryption prevention technique is effective in such case. Likewise, an already encrypted portion can be prevented from being encrypted again (double encryption).

As for a portion having no key required for decryption (a portion that cannot be decrypted), a process in the image decoding unit (to be described later) may be skipped. If a bitstream which is not decrypted undergoes an image decoding process, a scramble image is generated, and it is difficult to recognize the contents of an image from the scrambled image. Especially, when a bitstream corresponding to a low resolution of a given tile has normally been decrypted, and a bitstream corresponding to a high resolution of that tile does not undergo any decryption process, this tile is decoded while superposing a noise signal of high-frequency components on an image signal having low-frequency components. This may pose a problem when the use wants to "clearly browse a low-resolution image (without any noise)". Hence, the aforementioned technique that skips an image decoding process of an encrypted bitstream is effective in such case.

FIG. 18 is a block diagram showing the functional arrangement of a decryption apparatus (decryption system) according to this embodiment. The decryption apparatus (decryption system) shown in FIG. 18 comprises a first key generation unit 191, network unit 192, second key generation unit 193, code sequence decryption unit 194, control unit 195, and image decoding unit 196. Note that the network unit 192 may be omitted. In this case, the decryption apparatus comprises the first key generation unit 191, second key generation unit 193, code sequence decryption unit 194, control unit 195, and image decoding unit 196. Note that the first key generation unit 191, network unit 192, second key generation unit 193, code sequence decryption unit 194, and image decoding unit 196 in FIG. 18 make the same operations as those of the first key generation unit 121, network unit 122, second key generation unit 123, code sequence decryption unit 124, and image decoding unit 125, and a description thereof will be omitted. The control unit 195 will be described below.

Figure 19:
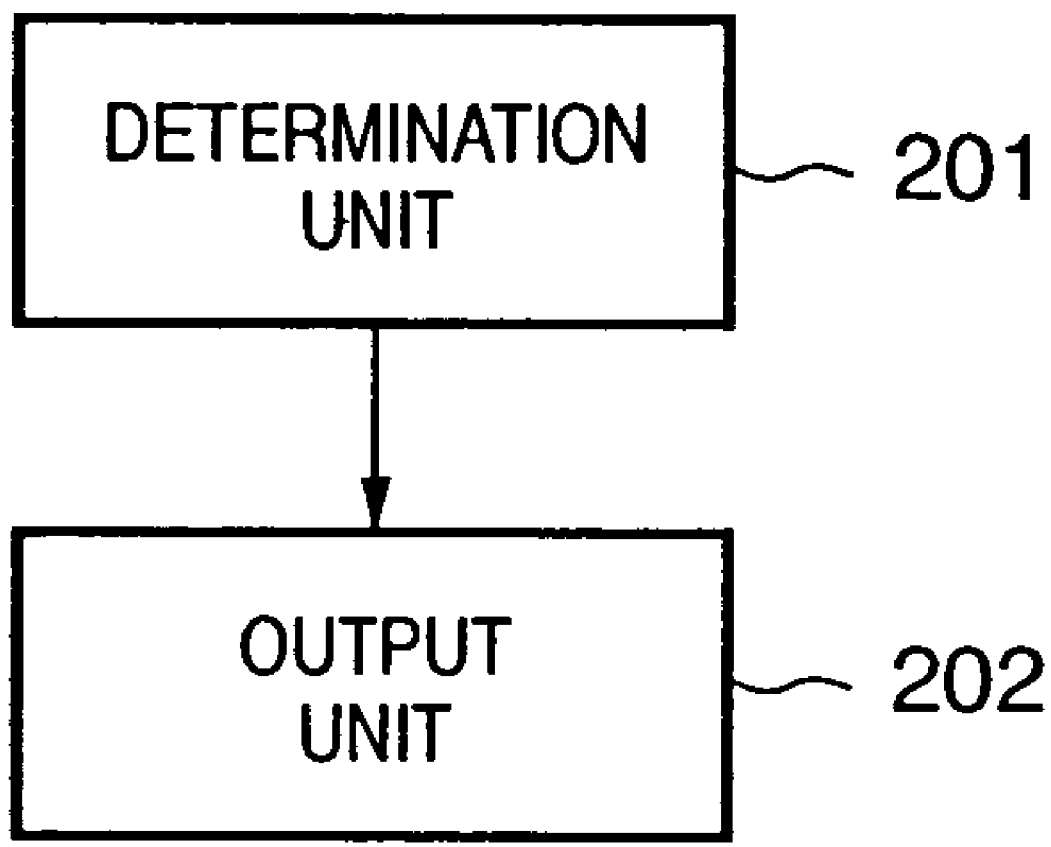
FIG. 19 is a block diagram showing the functional arrangement of a control unit 195 according to the fifth embodiment of the present invention.

FIG. 19 is a block diagram showing the functional arrangement of the control unit 195 according to this embodiment. As shown in FIG. 19, the control unit 195 comprises a determination unit 201 and output unit 202.

The determination unit 201 receives the ID reference table or encryption map, specifies encrypted bitstreams or packets using the ID reference table or encryption map, and outputs information associated with the determined bitstreams or packets. If the ID reference table or encryption map is encrypted, the determination unit 201 decrypts it. Alternatively, if the ID reference table or encryption map has undergone the signature process, the determination unit 201 executes a signature verification process. If a signature cannot be normally verified, the process ends.

When the ID reference table is used, in this embodiment, since a record corresponding to a bitstream that has undergone the decryption process in the previous code sequence decryption unit 194 is erased from the ID reference table, it is determined that bitstreams which have records in the ID reference table are encrypted.

When the encryption map is used, in this embodiment, since a bit corresponding to a packet that has undergone the decryption process in the previous code sequence decryption unit 194 is changed to "0", it is determined that packets corresponding to bits "1" in the encryption map are encrypted.

The output unit 202 receives information associated with (encrypted) bitstreams or packets determined by the control unit 201, and outputs only non-encrypted bitstreams or packets in the entire code sequence in accordance with the information associated with bitstreams or packets.

As described above, whether or not each bitstream or packet is encrypted is determined using the ID reference table or encryption map, and only non-encrypted bitstreams or packets are decoded. Hence, the user can browse a permitted image free from noise.

Another Embodiment

The objects of the present invention are also achieved by supplying a recording medium (or storage medium), which records a program code of a software program that can implement the functions of the above-mentioned embodiments to the system or apparatus, and reading out and executing the program code stored in the recording medium by a computer (or a CPU or MPU) of the system or apparatus. In this case, the program code itself read out from the recording medium implements the functions of the above-mentioned embodiments, and the recording medium which stores the program code constitutes the present invention.

The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the recording medium is written in a memory of the extension card or unit.

When the present invention is applied to the recording medium, that recording medium stores program codes corresponding to the aforementioned flow charts.

As described above, the present invention can facilitate management of keys used in encryption.

The present invention is not limited to the above embodiments and various changes and modifications can be made within the spirit and scope of the present invention. Therefore, to apprise the public of the scope of the present invention, the following claims are made.

The invention claimed is:

1. An information processing method of encrypting encoded image data including encoded data of each rectangle region obtained by dividing an image into N rectangle regions, encoded data of each rectangle region including data corresponding to each resolution of M resolutions arranged in ascending order of resolution or including data corresponding to each image quality of M qualities arranged in ascending order of image quality, comprising:
    a step of generating a key K unique to the encoded image data;
    a step of calculating, as a key $KT_n$ unique to a rectangle region n, an output value obtained by inputting an index n (n=1 to N) of the rectangle region n and the key K into a one-way function;
    a step of dividing encoded data of the rectangle region n into data $D_{nm}$ (m=1 to M) for each resolution or each image quality, wherein the data $D_{nm}$ having a smaller value for m is data of higher resolution or higher image quality;
    a step of generating a key $KT_{nm}$ unique to the data $D_{nm}$, wherein the key $KT_{nm}=KT_n$ if m=1, and the key $KT_{nm}=H(KT_{nm-1})$ using a one-way function H if m>1; and
    a step of encrypting the data $D_{nm}$ using the key $KT_{nm}$.

2. The method according to claim 1, wherein the encoded image data is encoded using a discrete wavelet transformation process and an arithmetic encoding process.

3. A computer readable storage medium storing a program for causing an apparatus to perform the method of claim 1.

4. An information processing apparatus for encrypting encoded image data including encoded data of each rectangle region obtained by dividing an image into N rectangle regions. encoded data of each rectangle region including data corresponding to each resolution of M resolutions arranged in ascending order of resolution or including data corresponding to each image quality of M qualities arranged in ascending order of image quality, comprising:

means for generating a key K unique to the image encoded data;

means for calculating, as a key $KT_n$ unique to a rectangle region n, an output value obtained by inputting an index n (n=1 to N) of the rectangle region n and the key K into a one-way function;

means for dividing encoded data of the rectangle region n into data $D_{nm}$ (m=1 to M) for each resolution or each image quality, wherein the data $D_{nm}$ having a smaller value for m is data of higher resolution or higher image quality;

a step of generating a key $KT_{nm}$ unique to the data $D_{nm}$, wherein the key $KT_{nm}=KT_n$ if m=1, and the key $KT_{nm}=H(KT_{nm-1})$ using a one-way function H if m>1; and a step of encrypting the data $D_{nm}$ using the key $KT_{nm}$.

* * * * *

UNITED STATES PATENT AND TRADEMARK OFFICE
CERTIFICATE OF CORRECTION

PATENT NO.       : 7,447,314 B2
APPLICATION NO.  : 10/965874
DATED            : November 4, 2008
INVENTOR(S)      : Junichi Hayashi Page 1 of 1

It is certified that error appears in the above-identified patent and that said Letters Patent is hereby corrected as shown below:

Title Page - Insert the following:

--(22) PCT Filed: Jun. 24, 2003

(86) PCT No.: PCT/JP03/07976

§ 371 (c)(1), (2), (4) Date: Oct. 18, 2004

(87) PCT Pub. No.: WO2004/004198

PCT Pub. Date: Jan. 8, 2004

(30) Foreign Application Priority Data

Jun. 28, 2002 (JP) ........................2002-191284--.

Signed and Sealed this

Third Day of March, 2009

JOHN DOLL
*Acting Director of the United States Patent and Trademark Office*